United States Patent [19]

Pfister et al.

[11] 3,904,647

[45] Sept. 9, 1975

[54] THIOXANTHONE CARBOXYLIC ACIDS AND DERIVATIVES

[75] Inventors: Jurg R. Pfister, Los Altos; Ian T. Harrison; John H. Fried, both of Palo Alto, all of Calif.

[73] Assignee: Syntex (U.S.A.) Inc., Palo Alto, Calif.

[22] Filed: Nov. 21, 1972

[21] Appl. No.: 308,569

Related U.S. Application Data

[63] Continuation-in-part of Ser. No. 273,290, July 19, 1972.

[52] U.S. Cl.......... 260/328; 260/250 A; 260/250 R; 260/251 R; 260/256.5 R; 260/294.8 B; 260/307 H; 260/307 R; 260/309; 260/310 R; 260/326.3; 424/250; 424/251; 424/263; 424/272; 424/273; 424/274; 424/275
[51] Int. Cl............................................ C07d 65/18
[58] Field of Search............ 260/328, 250 A, 250 R, 260/251 R, 256.5 R, 294.8 B, 307 H, 307 R, 309, 310 R, 326.3

[56] References Cited
UNITED STATES PATENTS

| | | | |
|---|---|---|---|
| 3,073,847 | 1/1963 | Doebel et al. | 260/328 |
| 3,642,997 | 2/1972 | Shen et al. | 424/250 |
| 3,706,768 | 12/1972 | Bays | 260/335 |

OTHER PUBLICATIONS

Vasiliu, Rev. Chim., 1968, 19(10), 561–565.
Vasiliu (II), Rev. Chim., 1969, 20(9), 545–546.
Gialdi et al., Farmaco, Ed. Sci. 14, 830–844, (1959).
Burger, Medicinal Chemistry, (Interscience, 1960), pp. 74–81.
Conant, Chem. of Org. Cpds., (1934), p. 269.
Lowy, An Intro. to Org. Chem., (1945), pp. 213–215.

*Primary Examiner*—Henry R. Jiles
*Assistant Examiner*—C. M. S. Jaisle
*Attorney, Agent, or Firm*—Gerard A. Blaufarb; Walter H. Dreger; William B. Walker

[57] ABSTRACT

Compositions containing and methods employing, as the essential ingredient, thioxanthone carboxylic acid compounds which are useful in the treatment of allergic conditions. Methods for preparing these compounds and compositions are also disclosed. Thioxanthone-2-carboxylic acid and 7-methoxy-thioxanthone-2-carboxylic acid are illustrated as representative of the class.

23 Claims, No Drawings

THIOXANTHONE CARBOXYLIC ACIDS AND DERIVATIVES

This is a continuation-in-part of application Ser. No. 273,290, filed July 19, 1972.

The present invention is directed to thioxanthone carboxylic acid compounds and to compositions containing and methods utilizing these compounds as the essential ingredient in the treatment of symptoms associated with allergic manifestations, for example, asthmatic conditions.

In a first aspect, the present invention relates to thioxanthone carboxylic acid compounds selected from those represented by the following formulas:

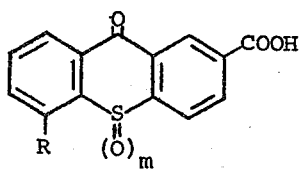

(A)

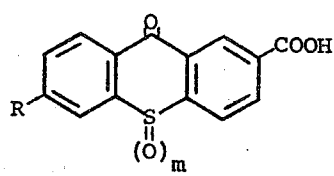

(B)

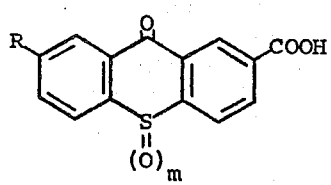

(C)

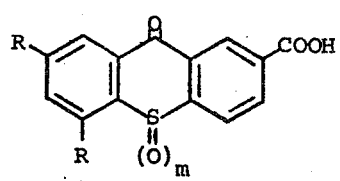

(D)

and the pharmaceutically acceptable, non-toxic esters, amides and salts thereof; wherein each m is the integer 0, 1 or 2, each R is lower alkyl; lower alkoxy; hydroxy and the conventional esters thereof; halo; mercapto; lower alkylthio; trifluoromethyl; or a group selected from those of the formulas:

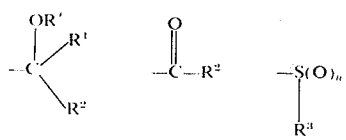

in which R' is hydrogen, lower alkyl, cycloalkyl, tetrahydrofuran-2-yl, tetrahydropyran-2-yl, tetrahydropyran-4-yl, 4-alkoxytetrahydropyran-4-yl, or acyl containing up to 12 carbon atoms; $R^1$ is hydrogen, lower alkyl, or cycloalkyl; $R^2$ is hydrogen, lower alkyl, cycloalkyl, phenyl, substituted phenyl (in which the substituent is halo, lower alkyl, lower alkoxy, lower alkylthio, trifluoromethyl, or cyano), or a monocyclic aromatic heterocyclic group having five or six total members, one or two of which are selected from nitrogen, oxygen, and sulfur; n is the integer 1 or 2, $R^3$ is lower alkyl when n is 1 and $R^3$ is lower alkyl, hydroxy, amino, monolower alkylamino, or dilower alkylamino when n is 2.

In a second aspect, the present invention is directed to a method useful for relieving symptoms associated with allergic manifestations such as are brought about by antigen-antibody (allergic) reactions. In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic products, e.g. histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

The compounds of the present invention also exhibit bronchopulmonary, e.g. bronchialdilating, activity and are therefore useful in the treatment of conditions in which such agents may be indicated, as for instance in the treatment of broncho constriction.

This aspect of the present invention thus relates to a method useful for inhibiting the effects of the allergic reaction and for the treatment of bronchopulmonary disorders which comprises administering an effective amount of a compound selected from those represented and defined by the above formulas; or a pharmaceutically acceptable non-toxic composition incorporating said compound as an essential ingredient.

The present invention, in a third aspect, is directed to pharmaceutical compositions useful for inhibiting the effects of the allergic reaction and for the treatment of bronchopulmonary disorders comprising an effective amount of a compound selected from those represented and defined by the above formulas; in admixture with a pharmaceutically acceptable nontoxic carrier.

In the practice of the method of the present invention, an effective amount of a compound of the present invention or pharmaceutical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered orally, topically, parenterally, or by inhalation and in the form of either solid, liquid, or gaseous dosages including tablets, suspensions, and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or, perhaps, imminent; however, the method hereof is also usefully practiced as continuous or prophylactic treatment.

In view of the foregoing as well as in consideration of the degree or severity of the condition being treated, age of subject, and so forth, all of which factors being determinable by routine experimentation by one skilled in the art; the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7,000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium cloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., *Immunology*, 16, 749 (1969).

The compounds of the present invention demonstrate bronchopulmonary activity as measured by tests indicative of such activity involving the isolated tracheal chain assay as substantially described, for example, by J. C. Castillo et al., *Journal of Pharmacology and Experimental Therapeutics*, Vol. 90, page 104 (1947) and the histamine aerosol bronchoconstriction assay as substantially described, for example, by O. H. Siegmund et al., *Journal of Pharmacology and Experimental Therapeutics*, Vol. 90, page 254 (1947).

Certain of the compounds of the present invention can be prepared in accordance with the following reaction sequence:

Sequence A

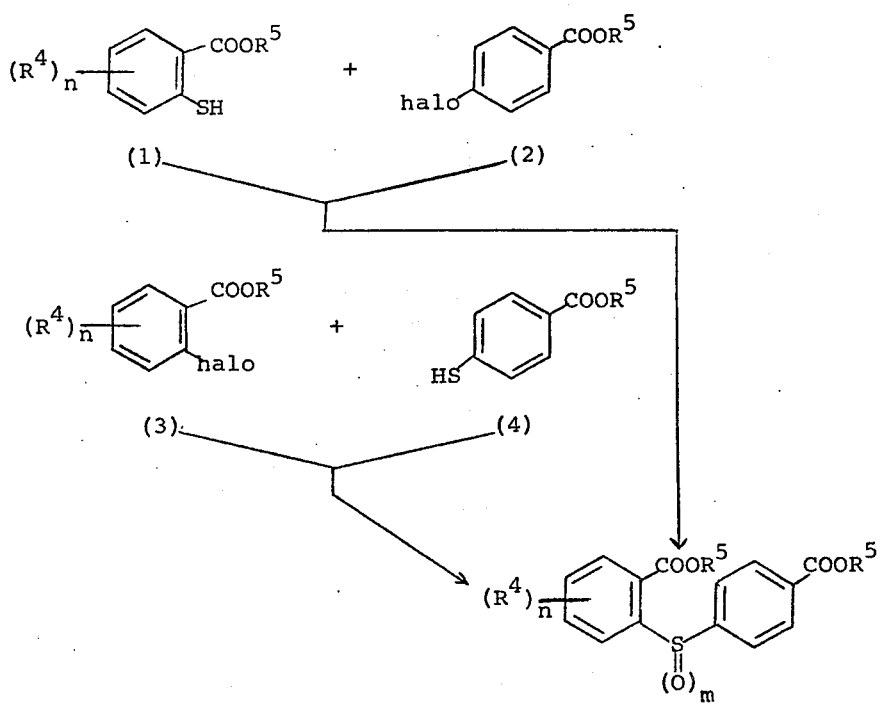

Sequence A – Continued

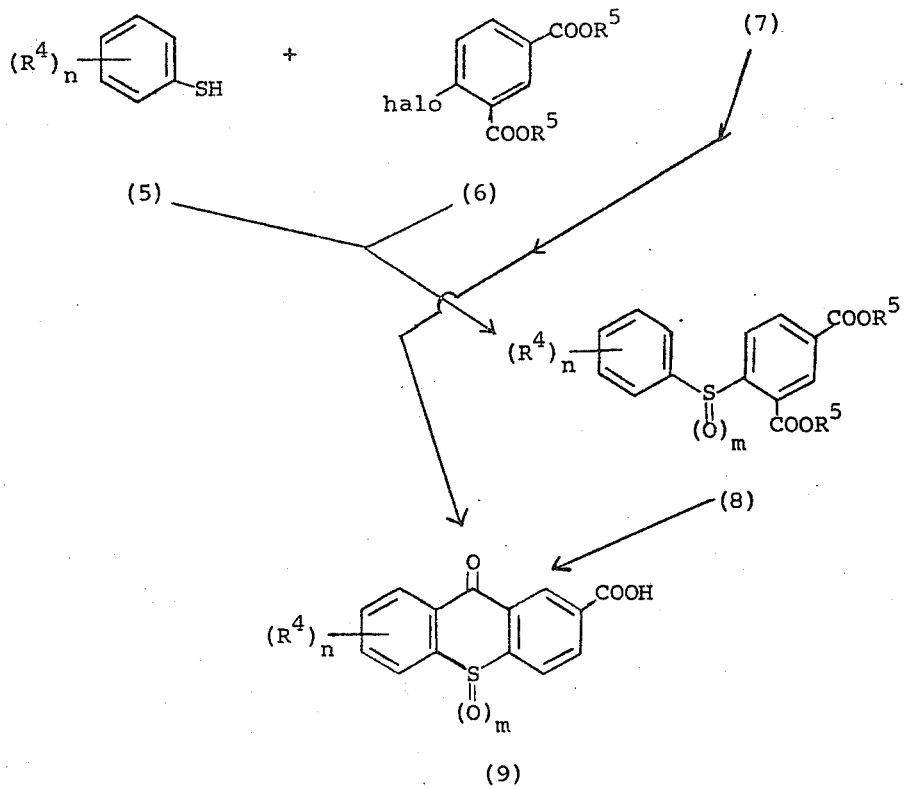

wherein R⁴ (at the C-5, C-6, C-7 or C-5,7 positions of the products 9) is hydrogen, lower alkyl, lower alkoxy, hydroxy, halo, mercapto, lower alkylthio, trifluoromethyl or acyl; m is the integer 0, 1, or 2; n is the integer 1 or 2; halo is bromo, chloro, fluoro, or iodo, preferably bromo; and each R⁵ is hydrogen or lower alkyl, preferably hydrogen or methyl.

With reference to the above reaction sequence, the o-mercaptobenzoic acid (1, R⁵=hydrogen) and p-halobenzoic acid (2, R⁵=hydrogen) are condensed in the presence of copper powder with anhydrous potassium carbonate, optionally in organic liquid reaction medium, preferably an organic amide, such as dimethylacetamide, dimethylformamide N-methylpyrrolidone, tetramethylurea, and so forth, to prepare the corresponding diacid compound (7; m=o).

The reaction is preferably conducted in an inert organic reaction medium, such as those listed above, or suitable mixtures of one or more of such media. The reaction is further conducted at temperatures ranging from about 80° to about 220°C, preferably from about 120° to 200°C, and for a period of time sufficient to complete the reaction, ranging from about 1 hour to about 4 hours.

The reaction consumes the reactants on the basis of one mole each of the reactants; however, the amounts of the reactants to be employed are not critical, some of the desired compound (7) product being obtained when employing any proportions thereof. In the preferred embodiments, the reaction is conducted by reacting from about 1 to about 3 moles each of the respective starting compounds in the presence of 3 to 5 moles of potassium carbonate and catalytic amounts of the copper powder. The inert organic reaction medium, if employed, is used in solvent amounts.

Similarly, the o-halobenzoic acid (3, R⁵=hydrogen) and p-mercaptobenzoic acid (4, R⁵=hydrogen) are condensed, as described above, to give the product (7; m=o). In a similar manner, the mercaptobenzene compound (5) is condensed with the 4-halo-1,3-dicarboxybenzene (6), as described above, to give the diacid product (8; m=o).

Alternatively, the above-described condensations are conducted with the corresponding esters of compounds (1), (2), (3), (4), and (6), i.e. R⁵=lower alkyl, to give the corresponding and respective diester (R⁵=lower alkyl) products (7) and (8). These condensations are conducted with the respective ester starting compounds in the presence of cuprous oxide optionally in organic liquid reaction medium, preferably an organic amide, such as dimethyl acetamide, dimethylformamide, N-methylpyrrolidone, tetramethylurea, and so forth.

The reaction is preferably conducted in an inert organic reaction medium, such as those listed above, or suitable mixtures of one or more of such media. The reaction is further conducted at temperatures ranging from about 80° to about 220°C, preferably from about 120° to 200°C, and for a period of time sufficient to complete the reaction, ranging from about 2 hours to about 24 hours.

The reaction consumes the reactants on the basis of one mole each of respective reactant per half mole of cuprous oxide. However, the amounts of the reactants to be employed are not critical, some of the desired compound product being obtained when employing any proportions thereof. In the preferred embodiments, the reaction is conducted by reacting from about 1 to about 1.1 moles each of the respective reactant in the presence of from about 0.5 to about 0.6 moles of the cuprous oxide. The inert organic reaction medium, if employed, is used in solvent amounts.

Thereafter, the prepared ester compounds (7) and (8) are base hydrolyzed to give the corresponding diacid compounds (7) and (8) ($R^5$=hydrogen; m=o), obtained directly in the alternate procedure described above, with copper powder and potassium carbonate. The base hydrolysis conditions can be any employed conventionally in the art. Generally, the hydrolysis reaction is conducted using an alkali metal hydroxide at about 50° to about 90°C and for a period of time sufficient to complete the reaction, ranging from about 15 minutes to about 60 minutes, preferably in the presence of inert organic reaction media, such as those normally employed in organic chemical reactions of this type, e.g. aqueous alkanol solutions. Although two moles of base are required per mole of compound (7) or (8), the amounts employed are not critical to produce the desired hydrolysis. Preferably from about 3 to about 5 moles of base are employed per mole of compound (7) or (8) and the reaction medium is used in solvent amounts.

The thus prepared diacid compounds (7) and (8) are then cyclized with phosphoryl chloride, thionyl chloride, sulfuric acid, hydrogen fluoride, or, preferably polyphosphoric acid (PPA), to give the corresponding substituted thioxanthone-2-carboxylic acid compound (9; m=o). The reaction is preferably, but optionally, conducted in an inert organic reaction medium including those usually employed in organic chemical reactions such as dimethylsulfoxide sulfolane, benzene, toluene, and so forth. The reaction is further conducted at temperatures ranging from about 60° to about 180°C and for a period of time sufficient to complete the reaction ranging from about 15 minutes to about 90 minutes.

Although the reaction consumes the reactants on the basis of one mole of starting compound (7) or (8) per mole of cyclizing reagent, the reaction can be performed using any proportion of reactants. In the preferred embodiments, however, the reaction is conducted using from about 20 to about 50 moles of the cyclizing reagent per mole of starting compound.

Alternative to the above described method, the (lower alkoxy) thioxanthone-2-carboxylic acid compounds can also be prepared by following the above indicated sequence which is practiced using a hydroxy or methoxy substituted ($R^4$) starting compound, (1), (3), or (5), cleaving the methoxy substituted product (9) with hydrobromic or hydroiodic acid and acetic acid, followed by treatment of the thus prepared hydroxy compound (9) with a lower alkyl halide in the presence of base followed by base treatment.

The conventional esters of the thus prepared hydroxy ($R^4$) compounds (9) are conventionally prepared by means known to those skilled in the art, for example, by treatment of the hydroxy compound with lower alkanoyl chloride or carboxylic anhydride in pyridine.

Compounds (7) and (8) wherein m=o, prepared as described above, can be oxidized with a peracid, such as peracetic acid, m-chloroperbenzoic acid, p-nitroperbenzoic acid, perphthalic acid, and so forth, to give the corresponding compounds wherein m is 1 or 2 and, accordingly, the products (9) wherein m is 1 or 2. The oxidation is preferably conducted in liquid reaction media, such as a chlorinated hydrocarbon, e.g. chloroform, methylene chloride, and carbon tetrachloride. The reaction is conducted at temperatures ranging from about 0° to about 60°C, preferably from 20° to about 30° and for a period of time sufficient to complete the reaction, ranging from about 1 hour to about 6 hours. When conducted at about 0°C with about 1 mole of peracid, the 10-oxo (7, 8; m=1) compounds are prepared; when conducted at about room temperature or more with about 2 moles of peracid, the 10,10-dioxo (7,8; m=2) compounds are prepared. The thus prepared oxo compounds are thereafter treated as hereinafter described to prepare the substituted thioxanthone compounds hereof in the 10-oxo and 10,10-dioxo series.

Alternatively, the compounds (9), wherein m=o, prepared as described above, can be oxidized to give the corresponding products (9), wherein m=1 or 2. When the oxidation is conducted with iodosobenzene in acetic acid, the products (9), wherein m=1, are prepared; when the oxidation is conducted with hydrogen peroxide in acetic acid, the products (9), wherein m=2, are prepared.

Certain of the compounds of the present invention can be prepared as follows:

Sequence B

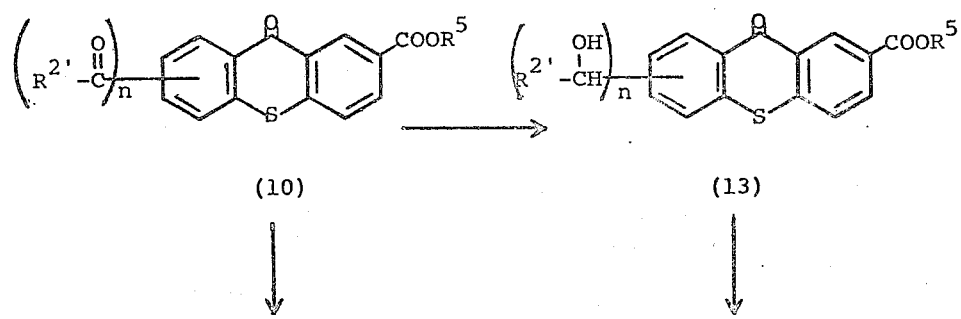

(10)     (13)

Sequence B—Continued

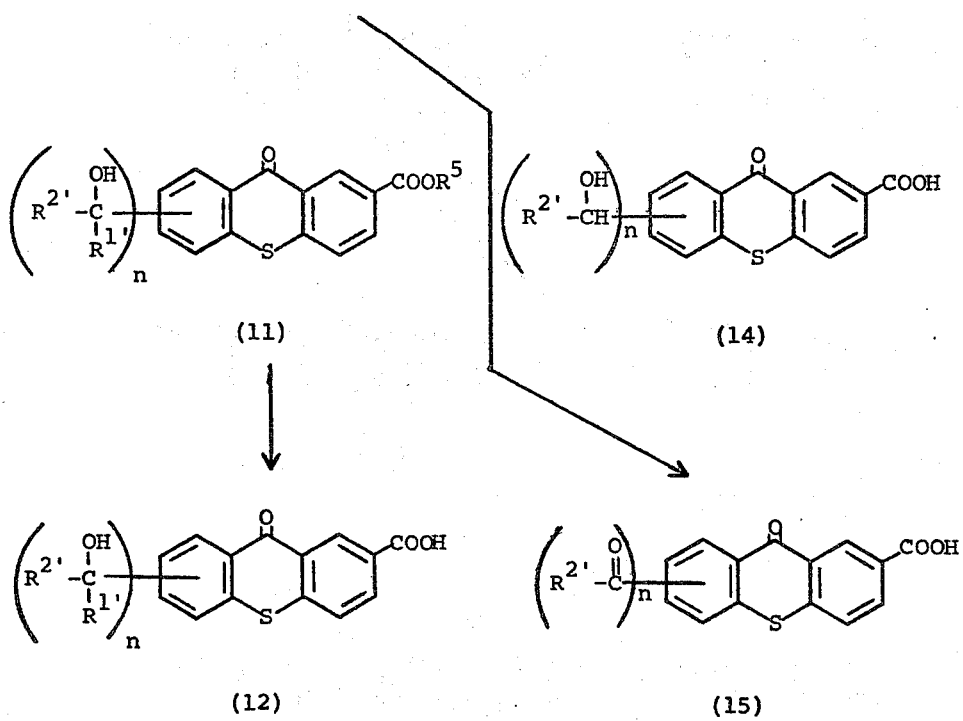

wherein $R^{1'}$ is $R^1$ exclusive of hydrogen and $R^{2'}$ is $R^2$ exclusive of hydrogen, and n is as above defined.

With reference to the above reaction sequence, the C-5, C-6, C-7, or C-5,7 acyl substituted thioxanthone-2-carboxylate (10) (prepared as described above, 5+6 → 8 → 9) can be hydrolyzed, as described above, to give the acylthioxanthone-2-carboxylic acid compounds (15).

Compounds (10) can also be reduced, such as by the known method using sodium borohydride, to give the corresponding (secondary hydroxyalkyl)-thioxanthone-2-carboxylate esters (13) which can be hydrolyzed to the acid products (14).

Compounds (10) can also be treated with alkyl or cycloalkyl (i.e. $R^{1'}$) Grignard reagent, under known Grignard reaction conditions, to give the corresponding (tertiary hydroxyalkyl)-thioxanthone-2-carboxylate esters (11) which can be hydrolyzed to the acid products (12).

Certain of the compounds of the present invention can be prepared in accordance with the following reaction sequence:

Sequence C

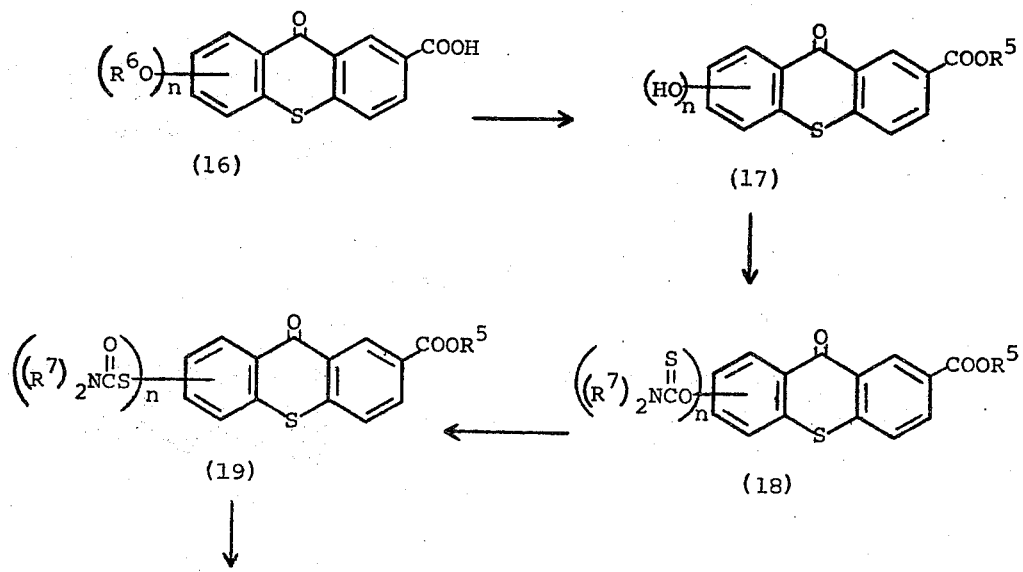

Sequence C —Continued
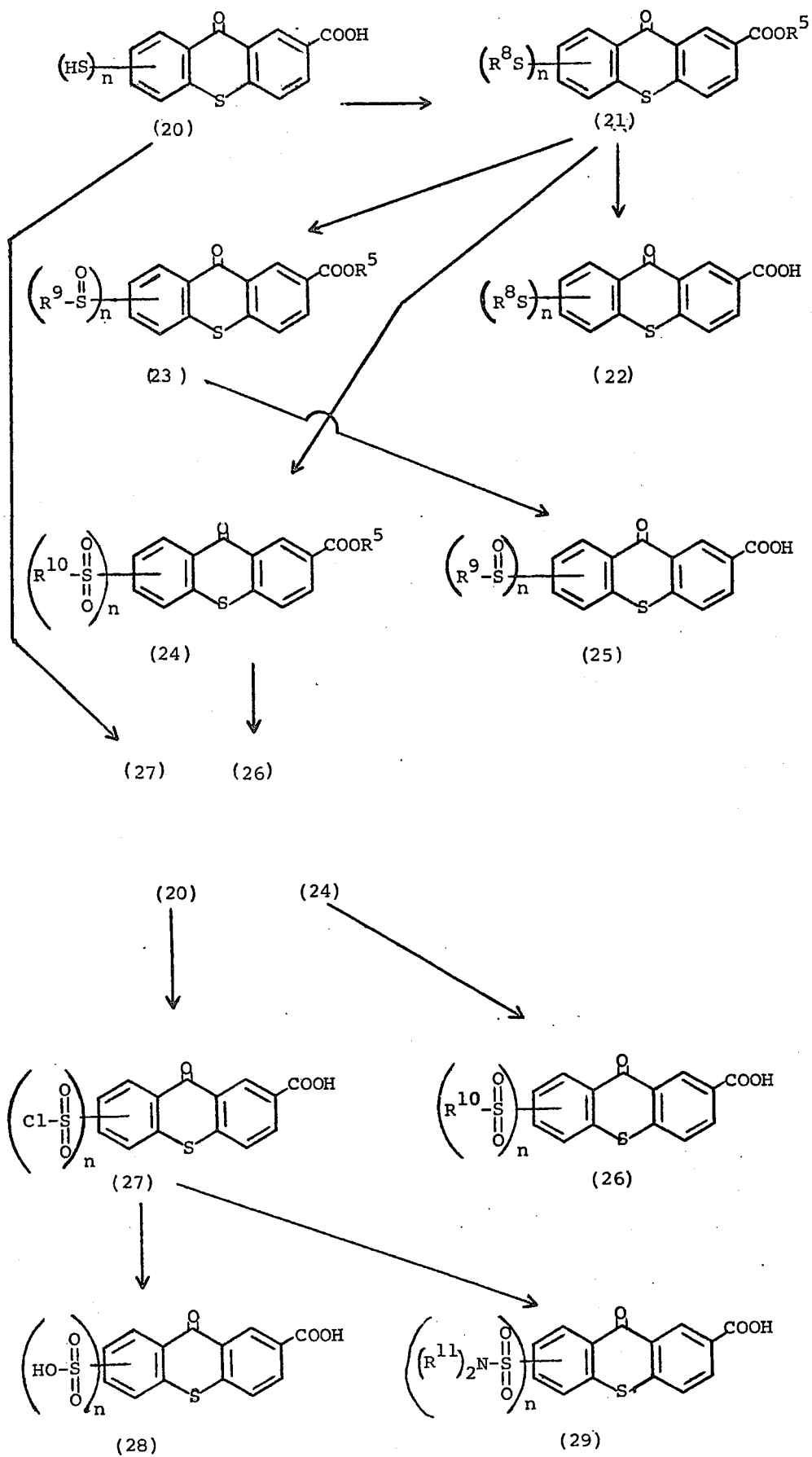

wherein each of $R^5$ and n is as defined above; $R^6$ is hydrogen or lower alkyl; and each of $R^7$, $R^8$, $R^9$, $R^{10}$, and $R^{11}$ is lower alkyl.

With reference to the above reaction sequence, a C-5, C-7, or C-5,7 alkoxy substituted compound (16; $R^6$=hydrogen) (prepared as described in Sequence A (5+6→8→9) is converted to the respective hydroxy compounds (16; $R^6$=hydrogen) by treatment with hydrobromic or hydroiodic acid and acetic acid. This reaction is conducted at a temperature of from about 100° to about 160°C. The thus prepared 5- and 7-hydroxy acid compounds are then esterified ($R^5$) to give compounds (17). This reaction is conducted with the desired lower alkyl iodide in the presence of lithium carbonate, at room temperature or with the desired lower alkanol in the presence of a trace of sulfuric acid at reflux.

The hydroxy acid esters (17) are then treated with a dialkylthiocarbamoyl chloride, such as dimethylthiocarbamoyl chloride, in the presence of base, such as an alkali metal hydride, and in organic liquid reaction media, preferably an organic amide, such as those listed above, to afford the products (18). The reaction is conducted at temperatures ranging from about 20° to about 100°C, preferably from 60° to about 80°C and for a period of time sufficient to complete the reaction, ranging from about 1 hour to about 6 hours. In the preferred embodiments, the reaction is conducted by reaction of from about 1.1 to about 1.5 moles of dialkylthiocarbamoyl chloride per mole of compound (17).

The product compounds (18) are then rearranged by reaction at a temperature of from about 200° to about 250°C, preferably from about 220° to about 230°C, and for a period of time ranging from about 1 hour to about 8 hours and in the presence of organic medium, such as sulfolane, nitrobenzene, triethyleneglycol, and so forth, which is preferably employed in solvent amounts, to give compound (19).

Compounds (19) are then converted to the corresponding mercapto acid compounds (20) by base hydrolysis, as described above. The lower alkylthio ether, ester compounds (21) are then prepared, as described above, or by reacting compounds (20) with a lower alkyl halide in the presence of base, such as potassium carbonate and organic liquid reaction media, such as those described above. The reaction is conducted at a temperature ranging from about 20° to about 90°C, preferably from 50° to about 80°C and for a period of time sufficient to complete the reaction, ranging from about 2 hours to about 16 hours.

Hydrolysis of the ester (21), as described above, affords the (lower alkylthio)-acid compounds (22).

Compound (21) can be oxidized with a peracid, such as peracetic acid, m-chloroperbenzoic acid, p-nitroperbenzoic acid, perphthalic acid, and so forth, to give compounds (23) and (24) which can be hydrolyzed, as above described, to give the corresponding compounds (25) and (26), respectively. The oxidation is preferably conducted in liquid reaction media, such as a chlorinated hydrocarbon, e.g. chloroform, methylene chloride, and carbon tetrachloride. The reaction is conducted at temperatures ranging from about 0° to about 60°C, preferably at about 0°C for preparing the sulfinyl compounds and at about room temperature for preparing the sulfonyl compounds and for a period of time sufficient to complete the reaction, ranging from about 1 hour to about 6 hours. In the preferred embodiments, the reaction is conducted by reaction of from about 1 to about 2.2 moles of peracid.

In said oxidation steps, a mixture of products (23) and (24) may be obtained which mixture can be conventionally separated, such as via chromatography, if desired, to isolate the oxidized products.

The above oxidation steps can also be practiced on starting compounds (22) to give respective products (25) or (26) without the need of a second hydrolysis step.

Alternatively, compounds (20) can be treated with excess chlorine under acidic conditions to afford compounds (27). This reaction is conducted employing a pH of about 1 by use of hydrochloric acid, optionally in acetic acid solution. The reaction is further conducted at temperatures ranging from about 20° to about 100°C, preferably from 50° to about 60°C and for a period of time sufficient to complete the reaction, ranging from about 2 hours to about 12 hours.

Compound (27) is then reacted with a base, such as alkali metal hydroxide under aqueous conditions and at a temperature ranging from about 20° to about 100°C, preferably from 80° to about 90°C and for a period of from about 1 hour to about 2 hours to give the sulfo-substituted acid compounds (28).

Compounds (27) can be treated with ammonia, monolower alkylamine, or dilower alkylamine to give the sulfamoyl, monolower alkylsulfamoyl, and dilower alkylsulfamoyl acid compounds (29). This reaction is conducted at temperatures ranging from about 0° to about 80°C, preferably from 20° to about 30°C, and for a period of time sufficient to complete the reaction, ranging from about 1 hour to about 8 hours. In the preferred embodiments, the reaction is conducted by reaction of from about 10 to about 20 moles of amine per mole of compound (27). This reaction is further conducted in organic reaction media, such as those described above, preferably tetrahydrofuran, dioxane, dimethylsulfoxide, and so forth.

The C-5, C-7, and C-5,7 chlorosulfonylthioxanthone-2-carboxylic acid compounds (27) are novel intermediates useful as described above.

Certain of the compounds of the present invention can be prepared in accordance with the following reaction sequence:

Sequence D

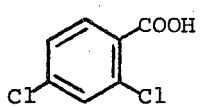

(30)

Sequence D—Continued

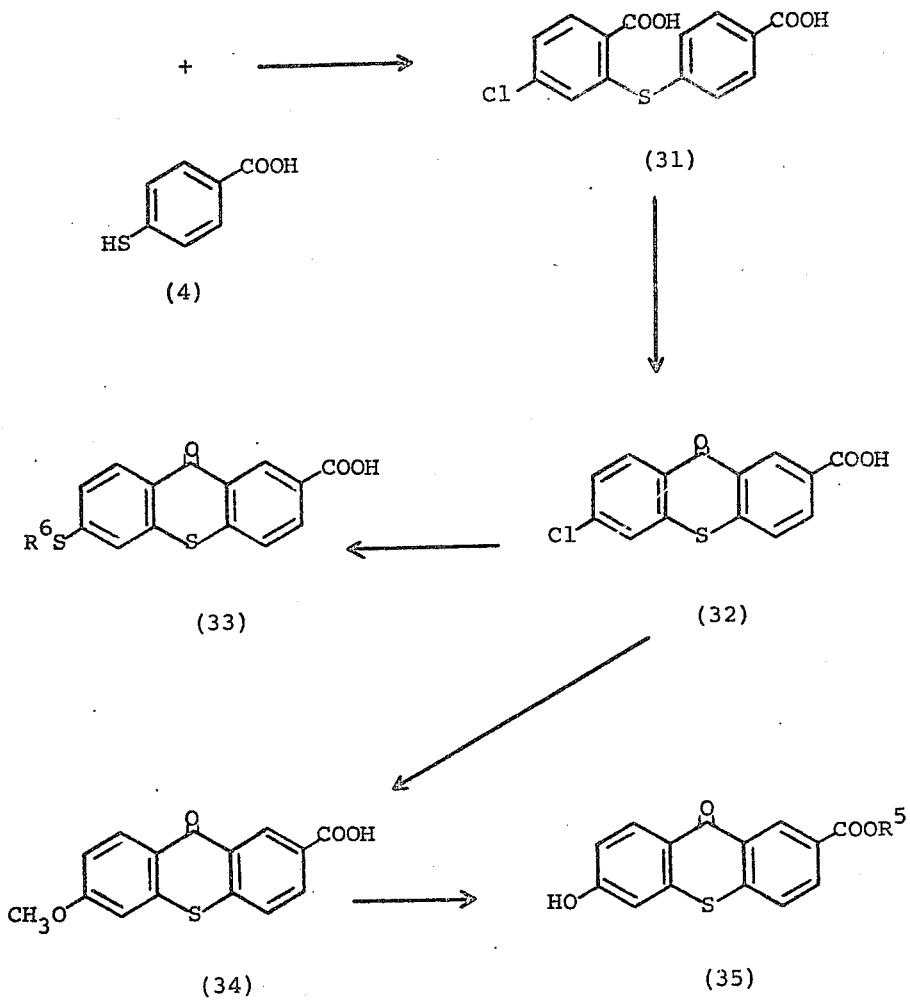

wherein each of $R^5$ and $R^6$ is as above defined.

With reference to the above reaction sequence, para-mercaptobenzoic acid (4) is condensed with the 2,4-dichlorobenzoic acid (30), as described above in Sequence A, with copper powder and anhydrous potassium carbonate to give compound (31).

The thus-prepared diacid compound (31) is then cyclized, as described above in Sequence A, with phosphoryl chloride, thionyl chloride, sulfuric acid, hydrogen fluoride, or, preferably, polyphosphoric acid (PPA), to give the corresponding 6-chlorothioxanthone-2-carboxylic acid compound (32).

The 6-chlorothioxanthone-2-carboxylic acid (32) is then treated with excess alkali metal lower alkoxide, e.g. sodium methoxide, to give compound (34) or with excess alkali metal thioloweralkoxide to give compounds (33). The reaction is preferably conducted in polar organic solvent at temperatures of from about 80° to about 150°C.

The 6-methoxythioxanthone-2-carboxylic acid compound (34) thus prepared is converted to the respective 6-hydroxy compound by treatment with hydrobromic or hydroiodic acid and acetic acid. This reaction is conducted at a temperature of from about 100° to about 160°C followed by esterification ($R^5$) to give compounds (35).

The alkylthio or hydroxy acid esters (33) and (35) are then treated, as described above in Sequence C (17 → 18 et seq.), to give the corresponding 6-substituted products hereof.

Certain of the compounds of the present invention can be prepared in accordance with the following reaction sequences:

Sequence E

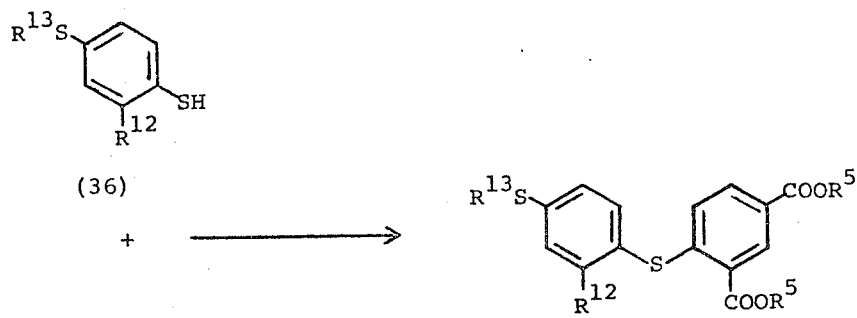

Sequence E—Continued
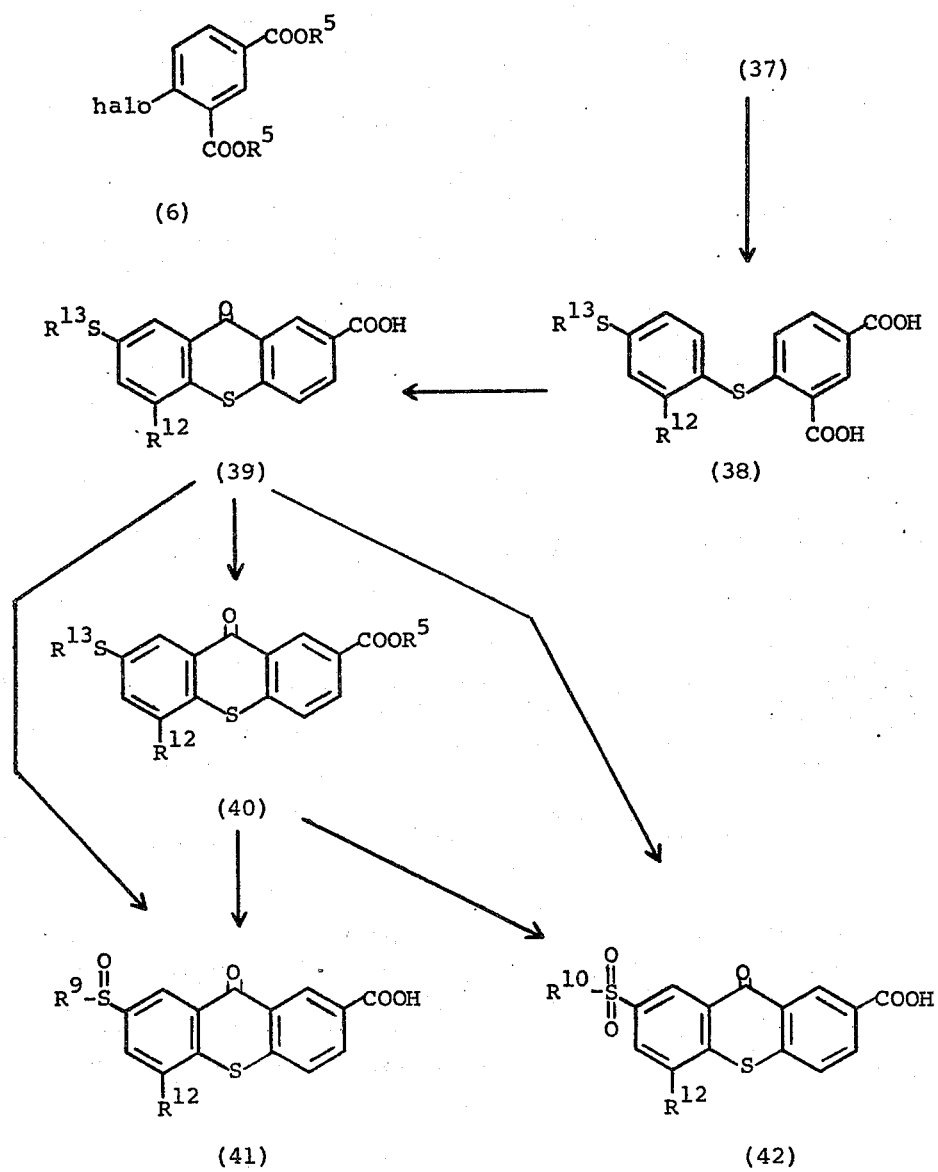
Sequence F
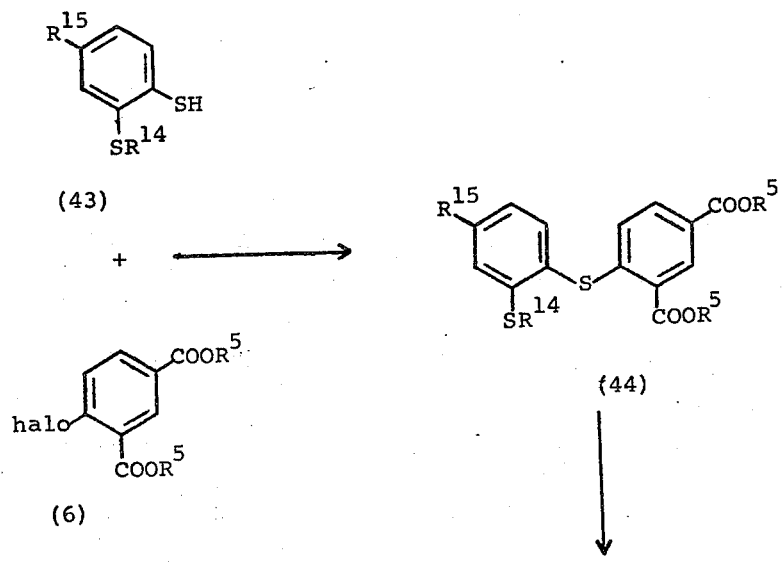

Sequence F—Continued

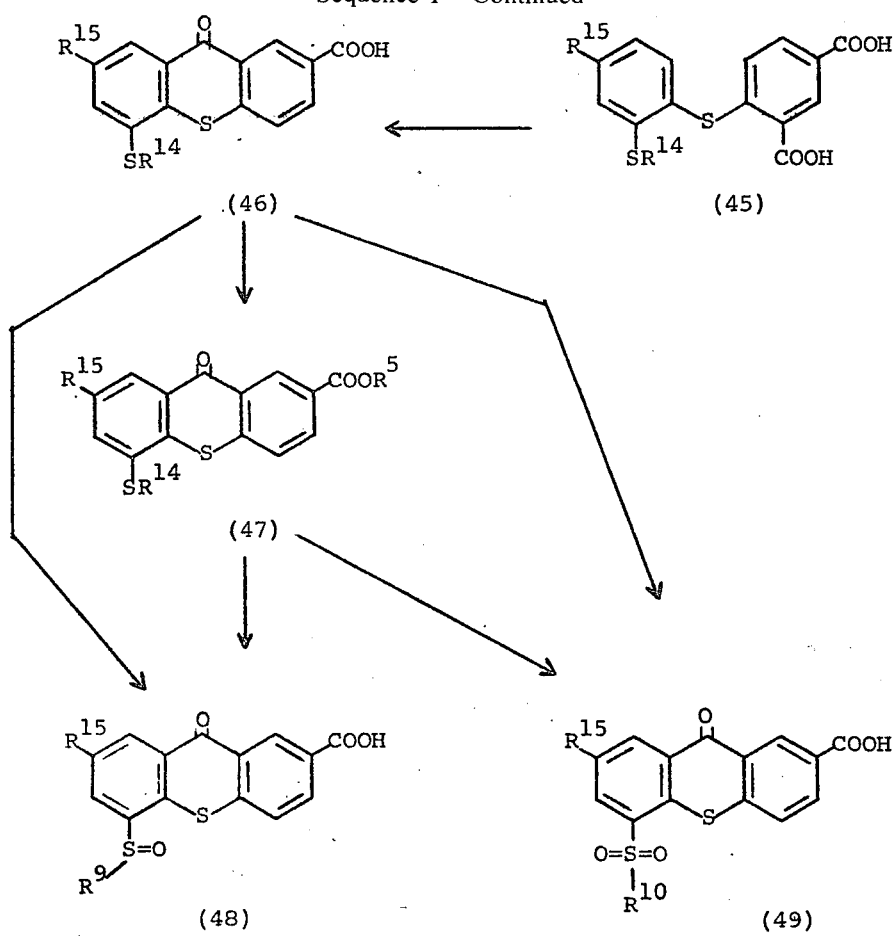

wherein $R^5$ is as above defined; each of $R^{12}$ and $R^{15}$ is lower alkyl, lower alkoxy, hydroxy, halo, or trifluoromethyl; and each of $R^{13}$ and $R^{14}$ is lower alkyl.

With reference to the above reaction sequences E and F, the 5- or 7-substituted- compounds (39) and corresponding compounds (46) are prepared as described above in Sequence A. Thereafter, the respective products are oxidized to the sulfinyl and sulfonyl compounds either directly or through the acid esters, as described above.

Certain of the compounds of the present invention can be prepared in accordance with the following reaction sequence:

Sequence G

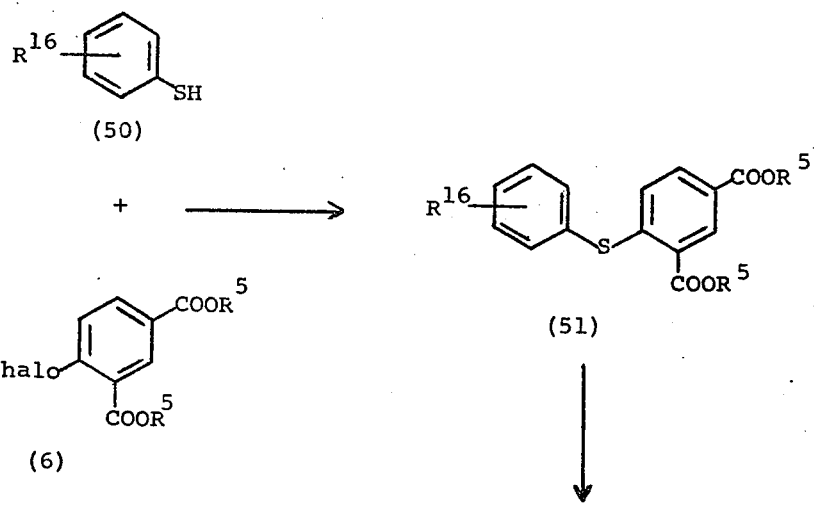

Sequence G—Continued

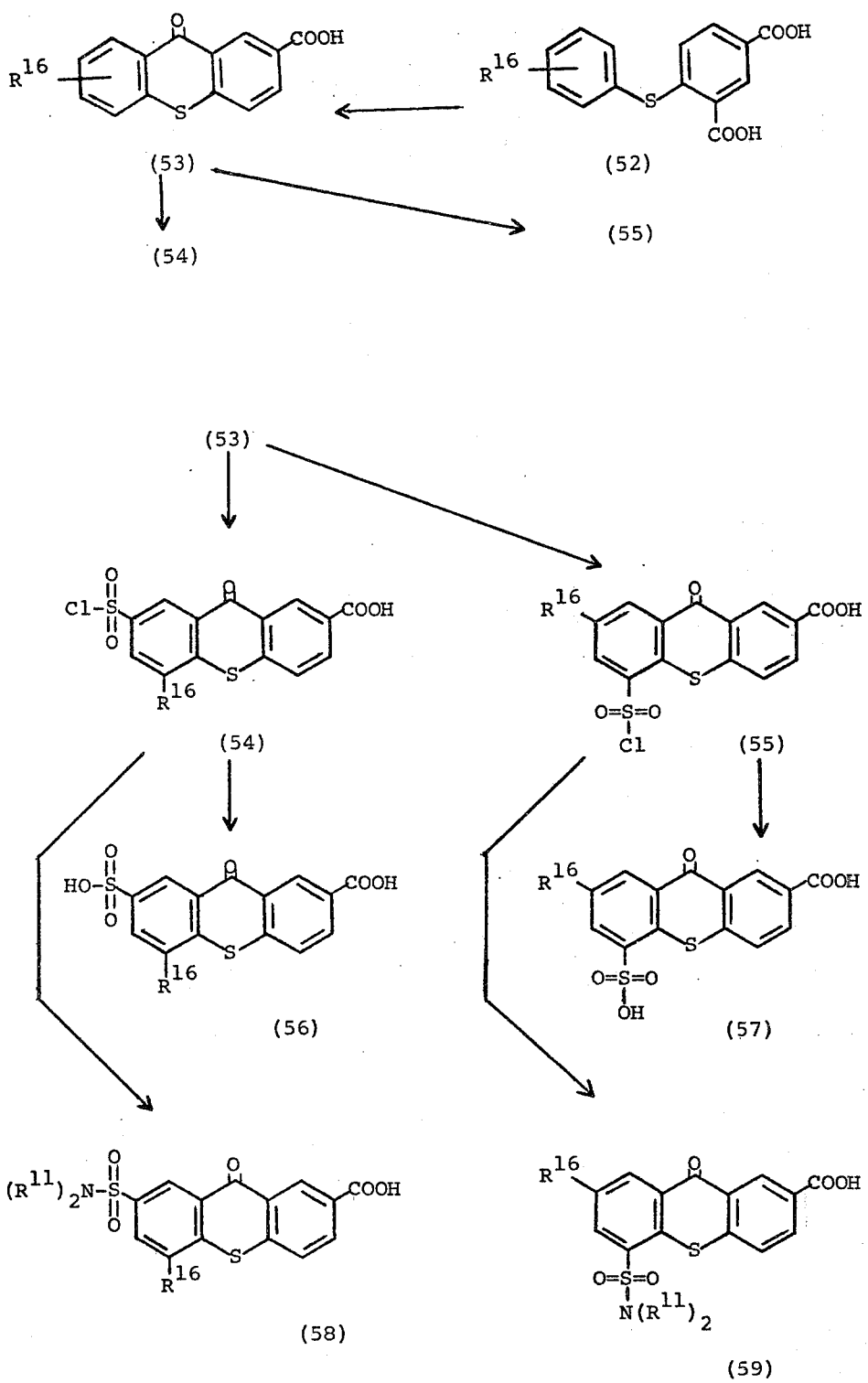

wherein each of halo, $R^5$ and $R^{11}$ is as defined above and $R^{16}$ is lower alkyl, lower alkoxy, halo, hydroxy, mercapto, lower alkylthio, or trifluoromethyl.

With reference to the above reaction sequence, the 5- or 7-substituted- compounds (53) are prepared as described above in Sequence A. Thereafter, the 5- or 7-chlorosulfonyl compounds (54) and (55) are prepared by treating (53) with chlorosulfonic acid and these are converted to the sulfo compounds (56) and (57) or the sulfamoyl compounds (58) and (59), such as described above.

Certain of the compounds of the present invention can be prepared in accordance with the following reaction sequence:

Sequence H

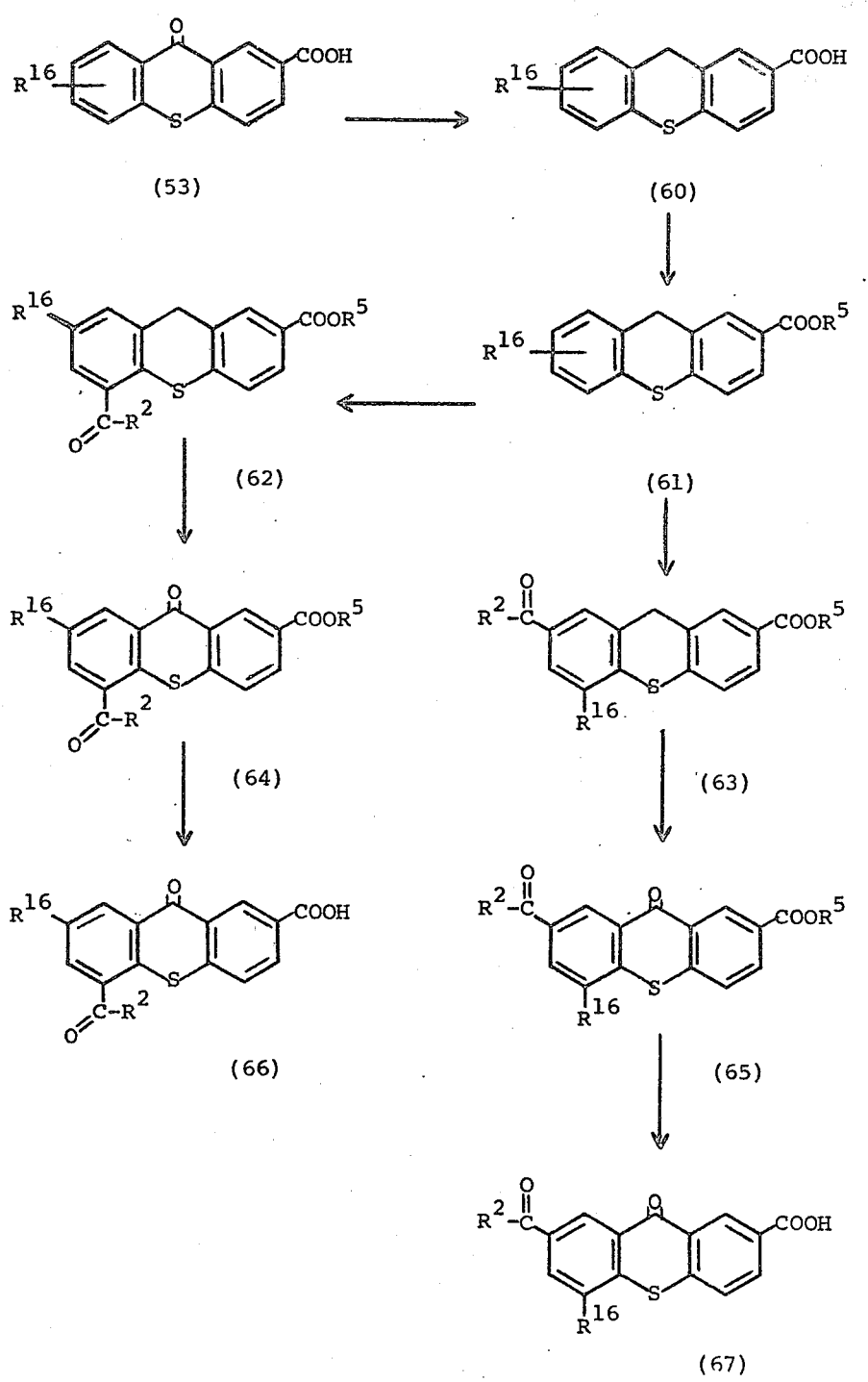

wherein each of halo, $R^5$, $R^{16}$ and $R^2$ is as above defined.

With respect to the above reaction sequence, compound (53) is prepared as described in Sequence G. Thereafter, the 9-oxo group is reduced, such as with potassium hydroxide in hydrazine, zinc and potassium hydroxide in ethanol, and the like, to prepare the corresponding C-5 or 7 substituted xanthene-2-carboxylic acid (60). This compound is esterified ($R^5$), as described above, and the ester (61) then acylated with a lower alkanoyl chloride in the presence of aluminum chloride to give the corresponding 5- or 7-lower alkanoyl compounds (62) and (63).

The compounds of formula (62 and 63) are oxidized with manganese dioxide to prepare the corresponding 5- or 7-(1-acyloxylower alkyl) xanthone-2-carboxylic acid esters (64 and 65) which, when hydrolyzed under base conditions, gives the corresponding thioxanthone-2-carboxylic acids (66 and 67).

The esters (62) and (63) can be reduced or treated with Grignard reagent, followed by oxidation at C-9 and hydrolysis to give the corresponding secondary and tertiary hydroxy alkyl thioxanthone-2-carboxylic acids.

The carboxylic esters of the secondary and tertiary hydroxy alkyl substituted compounds (i.e. R'=carboxylic acyl) are prepared as described above or by secondary and tertiary alcohol esterification methods known per se. One such method involves treating the products represented by Formula (14) with a carboxylic acid chloride or carboxylic acid anhydride in the presence of a base, preferably pyridine, at temperatues ranging from about 60° to 90°C and for a period of time ranging from about 1 to about 2 hours to give the corresponding secondary acyloxy alkyl substituted thioxanthone-2-carboxylic acid compound. Likewise, by treating the products of Formula (12) with a carboxylic acid chloride and dimethylaniline in tetrahydrofuran or with a mixed carboxylic acid, p-toluenesulfonic acid anhydride, the corresponding tertiary acyloxy alkyl substituted thioxanthone-2-carboxylic acid compounds are prepared. See Harrison and Harrison, *Compendium of Organic Synthetic Methods*, Wiley-Interscience, New York (1971), 281, and 2 and the references cited thereon.

The alkyl and cycloalkyl ethers of the secondary hydroxyalkyl series (R'=alkyl, cycloalkyl) are prepared by treatment of the thioxanthone acid ester with the appropriate alkyl or cycloalkyl halide and sodium hydride in, e.g. dimethylformamide, followed by hydrolysis, as described above. The etherification reaction is conducted at from about 50° to about 80°C and for from about 1 to about 5 hours. In the tertiary alcohol series, the alkyl and cycloalkyl ethers are prepared by treating the precursor acyl compound, e.g. 7-(acetyl)-thioxanthone-2-carboxylic acid ester, under Grignard conditions, as described above, but in the presence of appropriate alkyl or cycloalkyl iodide or bromide and hexamethylphosphoramide to concomitantly afford the alkyl or cycloalkyl ether of the tertiary alcohol, followed by hydrolysis as described above. See Harrison and Harrison, *Compendium of Organic Synthetic Methods*, Wiley-Interscience, New York (1971), 323 and the references cited thereon.

The t-butoxy ethers are prepared by treating the alcohol with isobutene in the presence of boron trifluoride and phosphoric acid in, e.g. methylene chloride, at temperatures of from about 10° to about 30°C and for from 10 to about 24 hours, or more, followed by hydrolysis of the acid ester group, as described above.

The tetrahydrofuran-2-yloxy and tetrahydropyran-2-yloxy ethers in the secondary and tertiary alcohol series are prepared by treatment with dihydrofuran or dihydropyran in the presence of p-toluenesulfonic acid and organic reaction medium, e.g. benzene, at about room temperature up to reflux, for from about 2 to about 5 days, followed by hydrolysis of the acid ester, as described above.

The 4-alkoxytetrahydropyran-4-yloxy ethers in the secondary and tertiary alcohol series are prepared by treatment of the alcohol with 4-alkoxy-5,6-dihydro-2H-pyran, as described above for the preparation of the furanyl and pyranyl ethers, followed by acid ester hydrolysis. Treatment of the 4-alkoxytetrahydropyran-4-yloxy ether with aluminum chloride and lithium aluminum hydride in organic reaction medium affords the corresponding tetrahydropyran-4-yloxy ethers which are oxidized to give the corresponding ethers in the thioxanthone acid series. The latter can be directly prepared by treating the alcohol with 4-bromotetrahydropyran and base. See Harrison and Harrison, *Compendium of Organic Synthetic Methods*, Wiley-Interscience, New York (1971), 129 and the references cited thereon.

The starting compounds for use in the present invention are known and can be prepared by processes known per se. Thus, the 1,3-dicarbo(lower)alkoxy-4-halobenzene starting compounds are conveniently prepared by oxidizing 1,3-dimethyl-4-halobenzene (4-halo-m-xylene) with potassium permanganate, as described above, followed by conventional esterification. The o,p-(diloweralkylthio)-thiophenol compounds are conveniently prepared by chlorosulfonation of the corresponding m-dialkylthiobenzenes followed by reduction of the chlorosulfonyl group with zinc and sulfuric acid.

The o,p-dialkoxythiophenol starting compounds are prepared by chlorosulfonation of the corresponding m-dialkoxybenzenes followed by reduction of the sulfonyl group with zinc and sulfuric acid.

The acid esters of the thioxanthone-2-carboxylic acids hereof are prepared upon treatment of the acid with ethereal diazoalkane, such as diazomethane and diazoethane, or with the desired lower alkyl iodide in the presence of lithium carbonate at room temperature or with the desired lower alkanol in the presence of a trace of sulfuric acid at reflux. The glycerol esters are prepared by treating the acid with thionyl chloride followed by treatment with a suitably protected ethylene glycol or propylene glycol (e.g. solketal) in pyridine, and hydrolyzing the protecting group of the ester thus formed with dilute acid.

The amides of the thioxanthone-2-carboxylic acids hereof are prepared by treatment of the acids with thionyl chloride followed by treatment with anhydrous ammonia, alkylamine, dialkylamine, dialkylaminoalkylamine, alkoxyalkylamine, or phenethylamine.

The salts of the thioxanthone-2-carboxylic acids hereof are prepared by treating the corresponding acids with pharmaceutically acceptable base. Representative salts derived from such pharmaceutically acceptable bases are sodium, potassium, lithium, ammonium, calcium, magnesium, ferrous, ferric, zinc, manganous, aluminum, manganic, the salts of trimethylamine, triethylamine, tripropylamine, β-(dimethylamino)ethanol, triethanolamine, β-(diethylamino)ethanol, arginine, lysine, histidine, N-ethylpiperidine, hydrabamine, choline, betaine, ethylenediamine, glucosamine, methyl glucamine, theobromine, purines, piperazine, piperidine, polyamine resins, caffeine, procaine, or the like. The reaction is conducted in an aqueous solution, alone or in combination with an inert, water miscible organic solvent, at a temperature of from about 0°C to about 100°C, preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids, the free acid starting material is treated with about one-half molar equivalent of pharmaceutically acceptable base. When the aluminum salts of the acids are prepared, about one-third molar equivalent of the pharmaceutically acceptable base are employed.

In the preferred embodiment of the present invention, the calcium salts and magnesium salts of the acids are prepared by treating the corresponding sodium or potassium salts of the acids with at least one-half molar equivalent of calcium chloride or magnesium chloride, respectively, in an aqueous solution, alone or in combination with an inert water miscible organic solvent, at a temperature of from about 20° to about 100°C.

In the preferred embodiment of the present invention, the aluminum salts of the acids are prepared by treating the acids with at least one-third molar equivalent of an aluminum alkoxide, such as aluminum triethoxide, aluminum tripropoxide and the like, in a hydrocarbon solvent, such as benzene, xylene, cyclohexane, and the like, at a temperature of from about 20° to about 115°C.

In the present specification and claims, by the term "lower alkyl" is intended a lower alkyl group containing one to five carbon atoms including straight and branched chain groups and cyclic alkyl groups, for example, methyl, ethyl, n-propyl, isopropyl, n-butyl, isobutyl, sec-butyl, t-butyl, n-pentyl, isopentyl, sec-pentyl, and t-pentyl, cyclopropyl, cyclobutyl, and cyclopentyl. By the term "lower alkoxy" is intended the group "O-lower alkyl" wherein "lower alkyl" is as defined above. By the term "lower alkyl thio" is intended the group "S-lower alkyl" wherein "lower alkyl" is as defined above. The term "substituted phenyl" includes p-substituted phenyl. The term "monocyclic aromatic heterocyclic group" includes pyridyl, pyridazinyl, pyrimidinyl, pyrazinyl, pyrazolyl, imidazolyl, furanyl, thienyl, pyrrolyl, isoxazolyl, and oxazolyl.

The following examples illustrate the method by which the present invention can be practiced.

EXAMPLE 1

A mixture of 10 grams of 4-bromobenzoic acid, 7.5 g. of o-mercaptobenzoic acid, 0.1 g. of copper powder and 8 g. of anhydrous potassium carbonate in 100 ml. of dimethylformamide is heated to 155°C and maintained thereat with stirring and under a nitrogen atmosphere. After monitoring via tlc indicates the reaction is substantially complete, the reaction mixture is diluted with water, treated with charcoal, filtered and the clear filtrate acidified. The precipitate is isolated by suction filtration, washed neutral and dried to give 4-(2-carboxyphenylthio)-benzoic acid.

5.2 g. of 4-(2-carboxyphenylthio)-benzoic acid in 40 ml. of concentrated sulfuric acid is stirred at 25°C for 8 hours. After this time, the reaction mixture is poured into 200 ml. of ice water and the resultant mixture is heated on a steam bath for 15 minutes. The mixture is cooled and filtered with the precipitate being washed with water and then recrystallized from acetic acid to give thioxanthone-2-carboxylic acid.

EXAMPLE 2

A mixture of 7.5 grams of 4-mercaptobenzoic acid, 10 g. of o-bromobenzoic acid, 0.1 g. of copper powder and 8 g. of anhydrous potassium carbonate in 100 ml. of dimethylformamide is heated to 155°C and maintained thereat with stirring and under a nitrogen atmosphere. After monitoring via tlc indicates the reaction is substantially complete, the reaction mixture is diluted with water, treated with charcoal, filtered and the clear filtrate acidified. The precipitate is isolated by suction filtration, washed neutral and dried to give 4-(2-carboxyphenylthio)-benzoic acid.

5.2 g. of 4-(2-carboxyphenylthio)-benzoic acid in 40 ml. of concentrated sulfuric acid is stirred at 25 °C for 8 hours. After this time, the reaction mixture is poured into 200 ml. of ice water and the resultant mixture is heated on a steam bath for 15 minutes. The mixture is cooled and filtered with the precipitate being washed with water and then recrystallized from acetic acid to give thioxanthone-2-carboxylic acid.

EXAMPLE 3

A mixture of 4.9 grams of 1,3-dicarboxy-4-bromobenzene, 2.4 g. of thiophenol, 0.5 g. of copper powder and 6.5 g. of anhydrous potassium carbonate in 50 ml. of dimethylformamide is heated to 150°C and maintained thereat with stirring and under a nitrogen atmosphere. After monitoring via tlc indicates the reaction is substantially complete, the reaction mixture is diluted with water, treated with charcoal, filtered and the clear filtrate acidified. The precipitate is isolated by suction filtration, washed neutral and dried to give 1,3-dicarboxy-4-phenylthiobenzene.

3.9 grams of 1,3-dicarboxy-4-phenylthiobenzene in 35 ml. of concentrated sulfuric acid is stirred at 25 °C for 10 hours. After this time, the reaction mixture is poured into 200 ml. of ice water and the resultant mixture is heated on a steam bath for 15 minutes. The mixture is cooled and filtered with the precipitate being washed with water and then recrystallized from acetic acid to give thioxanthone-2-carboxylic acid.

The second step cyclization reaction of each of Examples 1 to 3 can also be conducted via the following representative procedure:

A mixture of 1.94 g. of 4-(2-carboxyphenylthio)-benzoic acid, 40 ml. of sulfolane and 30 ml. of polyphosphoric acid is stirred at 160°C for 30 minutes. The resultant mixture is then diluted with water and the diluted mixture filtered. The precipitate is washed neutral, and then dissolved and heated in ethanol containing charcoal. The resultant mixture is then filtered, and the ethanol is partially evaporated. Water is added until crystallization starts. Filtration gives the solid product thioxanthone-2-carboxylic acid which can be recrystalized from ethanol.

EXAMPLE 4

The procedures of Examples 1, 2 and 3 are repeated using the appropriate substituted o-mercaptobenzoic acid (Paragraph 1 of Example 1), o-bromobenzoic acid (Paragraph 1 of Example 2), and thiophenol (Paragraph 1 of Example 3) to furnish the following substituted thioxanthone-2-carboxylic acid products:

7-(methyl)-thioxanthone-2-carboxylic acid,
7-(ethyl)-thioxanthone-2-carboxylic acid,
7-(n-propyl)-thioxanthone-2-carboxylic acid,
7-(isopropyl)-thioxanthone-2-carboxylic acid,
7-(n-butyl)-thioxanthone-2-carboxylic acid,
7-(isobutyl)-thioxanthone-2-carboxylic acid,
7-(sec-butyl)-thioxanthone-2-carboxylic acid,
7-(t-butyl)-thioxanthone-2-carboxylic acid,
7-(pentyl)-thioxanthone-2-carboxylic acid,
7-(cyclopropyl)-thioxanthone-2-carboxylic acid,
7-(cyclobutyl)-thioxanthone-2-carboxylic acid,
7-(cyclopentyl)-thioxanthone-2-carboxylic acid,
7-(methoxy)-thioxanthone-2-carboxylic acid,
7-(ethoxy)-thioxanthone-2-carboxylic acid,
7-(n-propoxy)-thioxanthone-2-carboxylic acid
7-(isopropoxy)-thioxanthone-2-carboxylic acid,
7-(n-butoxy)-thioxanthone-2-carboxylic acid,
7-(isobutoxy)-thioxanthone-2-carboxylic acid,
7-(sec-butoxy)-thioxanthone-2-carboxylic acid,
7-(t-butoxy)-thioxanthone-2-carboxylic acid,
7-(pentoxy)-thioxanthone-2-carboxylic acid,
7-(cyclopropoxy)-thioxanthone-2-carboxylic acid,
7-(cyclobutoxy)-thioxanthone-2-carboxylic acid,
7-(cyclopentoxy)-thioxanthone-2-carboxylic acid,
7-(hydroxy)-thioxanthone-2-carboxylic acid,
7-(mercapto)-thioxanthone-2-carboxylic acid,
7-(methylthio)-thioxanthone-2-carboxylic acid,
7-(ethylthio)-thioxanthone-2-carboxylic acid,
7-(n-propylthio)-thioxanthone-2-carboxylic acid,
7-(isopropylthio)-thioxanthone-2-carboxylic acid,
7-(n-butylthio)-thioxanthone-2-carboxylic acid,
7-(isobutylthio)-thioxanthone-2-carboxylic acid,
7-(sec-butylthio)-thioxanthone-2-carboxylic acid,
7-(t-butylthio)-thioxanthone-2-carboxylic acid, 7-(pentylthio)-thioxanthone-2-carboxylic acid,
7-(cyclopropylthio)-thioxanthone-2-carboxylic acid,
7-(cyclobutylthio)-thioxanthone-2-carboxylic acid,
7-(cyclopentylthio)-thioxanthone-2-carboxylic acid,
7-(trifluoromethyl)-thioxanthone-2-carboxylic acid,
7-(acetyl)-thioxanthone-2-carboxylic acid,
7-(propionyl)-thioxanthone-2-carboxylic acid,
7-(n-butyryl)-thioxanthone-2-carboxylic acid,
7-(isobutyryl)-thioxanthone-2-carboxylic acid,
7-(n-pentanoyl)-thioxanthone-2-carboxylic acid,
7-(isopentanoyl)-thioxanthone-2-carboxylic acid,
7-(sec-pentanoyl)-thioxanthone-2-carboxylic acid,
7-(t-pentanoyl)-thioxanthone-2-carboxylic acid,
7-(n-hexanoyl)-thioxanthone-2-carboxylic acid,
7-(n-heptanoyl)-thioxanthone-2-carboxylic acid,
7-(n-octanoyl)-thioxanthone-2-carboxylic acid,
7-(n-nonanoyl)-thioxanthone-2-carboxylic acid,
7-(cyclopropylcarbonyl)-thioxanthone-2-carboxylic acid,
7-(cyclobutylcarbonyl)-thioxanthone-2-carboxylic acid,
7-(cyclopentylcarbonyl)-thioxanthone-2-carboxylic acid,
7-(cyclohexylcarbonyl)-thioxanthone-2-carboxylic acid,
7-(formyl)-thioxanthone-2-carboxylic acid,
7-(chloro)-thioxanthone-2-carboxylic acid,
7-(fluoro)-thioxanthone-2-carboxylic acid,
7-(bromo)-thioxanthone-2-carboxylic acid,
7-(benzoyl)-thioxanthone-2-carboxylic acid,
7-(p-chlorobenzoyl)-thioxanthone-2-carboxylic acid,
7-(p-methylbenzoyl)-thioxanthone-2-carboxylic acid,
7-(p-methoxybenzoyl)-thioxanthone-2-carboxylic acid,
7-(p-thiomethoxybenzoyl)-thioxanthone-2-carboxylic acid,
7-(furoyl)-thioxanthone-2-carboxylic acid,
7-(pyrroyl)-thioxanthone-2-carboxylic acid,
7-(thenoyl)-thioxanthone-2-carboxylic acid,
7-(pyridylcarbonyl)-thioxanthone-2-carboxylic acid,
7-(imidazolylcarbonyl)-thioxanthone-2-carboxylic acid, and
7-(oxazolylcarbonyl)-thioxanthone-2-carboxylic acid, and the corresponding 70 compounds in the C-5 substituted series, i.e. 5-(methyl)-thioxanthone-2-carboxylic acid, 5-(ethyl)-thioxanthone-2-carboxylic acid, 5-(isopropoxy)-thioxanthone-2-carboxylic acid, and so forth, and the corresponding 70 compounds in the C-6 substituted series, i.e. 6-(methyl)-thioxanthone-2-carboxylic acid, 6-(ethyl)-thioxanthone-2-carboxylic acid, 6-(isopropoxy)-thioxanthone-2-carboxylic acid, and so forth, and the corresponding 70 compounds in the C-5,7 disubstituted series, i.e. 5,7-di(methyl)-thioxanthone-2-carboxylic acid, 5,7-di(ethyl)-thioxanthone-2-carboxylic acid, 5,7-(diisopropoxy)-thioxanthone-2-carboxylic acid, and so forth.

EXAMPLE 5

A mixture of 4.188 grams of 1,3-dicarbomethoxy-4-bromobenzene, 2.85 g. of p-(methoxy)-thiophenol, 1.32 g. of cuprous oxide in 20 ml. of dimethylacetamide is heated to 160°C and maintained thereat with stirring and under a nitrogen atmosphere. After monitoring via tlc indicates the reaction is substantially complete, the reaction mixture is diluted with water and extracted with diethylether:methylene chloride (3:1). The extracts are chromatographed on 150 g. of alumina and the uniform fractions combined to give 1,3-dicarbomethoxy-4-(p-(methoxy)-thiophenyloxy)-benzene.

1,3-Dicarbomethoxy-4-(p-(methoxy)-thiophenyloxy)-benzene (3 g.) is combined with 150 ml. of 5% potassium hydroxide in methanol. The resultant mixture is refluxed for one hour after which time it is acidified, cooled and filtered, to give 1,3-dicarboxy-4-(p-(methoxy)-thiophenyloxy)-benzene.

A mixture of 1.94 g. of 1,3-dicarboxy-4-(p-(methoxy)-thiophenyloxy-benzene, 40 ml. of sulfolane and 30 ml. of polyphosphoric acid is stirred at 160°C for 30 minutes. The resultant mixture is then diluted with water and the diluted mixture filtered. The precipitate is washed neutral, and then dissolved and heated in ethanol containing charcoal. The resultant mixture is then filtered, and the ethanol is partially evaporated. Water is added until crystallization starts. Filtration gives the solid product 7-(methoxy)-thioxanthone-2-carboxylic acid which can be recrystallized from ethanol.

The foregoing procedure can be practiced using an alternative 1,3-dicarboloweralkoxy-4-halo starting compound, such as 1,3-dicarbomethoxy-4-chloro- (or iodo) benzene, 1,3-dicarboethoxy-4-fluoro-benzene, 1,3-dicarboethoxy-4-bromobenzene, and the like, with similar results.

Likewise, the foregoing procedure can be practiced using the corresponding esters of the starting compounds of Examples 1 and 2, i.e. methyl 4-bromobenzoate and methyl o-mercaptobenzoate (Example 1) and methyl 4-mercaptobenzoate and methyl o-bromobenzoate (Example 2) to similarly prepare thioxanthone-2-carboxylic acid.

Likewise prepared in accordance with the foregoing are the other compounds listed in Example 4 above.

EXAMPLE 5A 4-(2-Carboxyphenylthio)-benzoic acid (820 mg.) in 30 ml. of methylene chloride is cooled to 0°C (ice). m-Chloroperbenzoic acid (610 mg.) is then added and the mixture is stirred at 0°C for 75 minutes. The reaction mixture is then filtered through alumina and washed with methylene chloride to give S-oxo-4-(2-carboxyphenylthio)-benzoic acid. Similarly, S,S-dioxo-4-(2-carboxyphenylthio)-benzoic acid is prepared using the excess peracid at 40°C for 6 hours.

The thus prepared compounds are cyclized, as described in Examples 1 to 3, to give 10-oxothioxanthone-2-carboxylic acid and 10,10-dioxothioxanthone-2-carboxylic acid, respectively.

In like manner, 1,3-dicarboxy-4-phenylthiobenzene can be so oxidized and the oxo products cyclized to give the 10-oxo- and 10,10-dioxothioxanthone-2-carboxylic acid products.

Thus prepared, e.g. are the 10-oxo and 10,10-dioxo compounds otherwise corresponding to the products of Example 4, i.e.

7-methyl-10-oxothioxanthone-2-carboxylic acid,
7-methyl-10,10-dioxothioxanthone-2-carboxylic acid,
7-ethyl-10-oxothioxanthone-2-carboxylic acid,
7-ethyl-10,10-dioxothioxanthone-2-carboxylic acid,
7-n-propyl-10-oxothioxanthone-2-carboxylic acid,
7-n-propyl-10,10-dioxothioxanthone-2-carboxylic acid,
7-isopropyl-10-oxothioxanthone-2-carboxylic acid,
7-isopropyl-10,10-dioxothioxanthone-2-carboxylic acid, and so forth,
7-methoxy-10-oxothioxanthone-2-carboxylic acid, 7-methoxy-10,10-dioxothioxanthone-2-carboxylic acid,
7-ethoxy-10-oxothioxanthone-2-carboxylic acid,
7-ethoxy-10,10-dioxothioxanthone-2-carboxylic acid,
7-n-propoxy-10-oxothioxanthone-2-carboxylic acid,
7-n-propoxy-10,10-dioxothioxanthone-2-carboxylic acid,
7-isopropoxy-10-oxothioxanthone-2-carboxylic acid,
7-isopropoxy-10,10-dioxothioxanthone-2-carboxylic acid, and so forth,
7-methylthio-10-oxothioxanthone-2-carboxylic acid,
7-methylthio-10,10-dioxothioxanthone-2-carboxylic acid,
7-ethylthio-10-oxothioxanthone-2-carboxylic acid,
7-ethylthio-10,10-dioxothioxanthone-2-carboxylic acid,
7-n-propylthio-10-oxothioxanthone-2-carboxylic acid,
7-n-propylthio-10,10-dioxothioxanthone-2-carboxylic acid,
7-isopropylthio-10-oxothioxanthone-2-carboxylic acid,
7-isopropylthio-10,10-dioxothioxanthone-2-carboxylic acid, and so forth,
7-acetyl-10-oxothioxanthone-2-carboxylic acid,
7-acetyl-10,10-dioxothioxanthone-2-carboxylic acid,
7-propionyl-10-oxothioxanthone-2-carboxylic acid,
7-propionyl-10,10-dioxothioxanthone-2-carboxylic acid, and so forth,
7-cyclopropylcarbonyl-10-oxothioxanthone-2-carboxylic acid,
7-cyclopropylcarbonyl-10,10-dioxothioxanthone-2-carboxylic acid,
7-cyclobutylcarbonyl-10-oxothioxanthone-2-carboxylic acid,
7-cyclobutylcarbonyl-10,10-dioxothioxanthone-2-carboxylic acid, and so forth,
7-benzoyl-10-oxothioxanthone-2-carboxylic acid,
7-benzoyl-10,10-dioxothioxanthone-2-carboxylic acid, and so forth,
7-furoyl-10-oxothioxanthone-2-carboxylic acid,
7-furoyl-10,10-dioxothioxanthone-2-carboxylic acid,
7-pyrroyl-10-oxothioxanthone-2-carboxylic acid,
7-pyrroyl-10,10-dioxothioxanthone-2-carboxylic acid,
7-thenoyl-10-oxothioxanthone-2-carboxylic acid,
7-thenoyl-10,10-dioxothioxanthone-2-carboxylic acid, and so forth.

The hydroxy compounds can be prepared from the lower alkoxy compounds of Example 4 according to the following representative procedure.

EXAMPLE 6

A mixture of 11 grams of 7-(methoxy)-thioxanthone-2-carboxylic acid in 100 ml. of concentrated aqueous hydrogen iodide and 100 ml. of acetic acid is refluxed for 4 hours. After this time, the mixture is cooled, diluted with water, and filtered. The precipitate is washed and dried to give 7-(hydroxy)-thioxanthone-2-carboxylic acid.

EXAMPLE 7

This example illustrates the manner by which the esters of the 5- and 7-(hydroxy)-thioxanthone-2-carboxylic acids are prepared.

A mixture of 2 grams of 7-(hydroxy)-thioxanthone-2-carboxylic acid in 8 ml. of pyridine and 4 ml. of acetyl chloride is heated at steam bath temperatures for 1 hour. The mixture is then poured into ice water and the solid which forms is collected by filtration, washed with water and dried to yield 7-(acetoxy)-thioxanthone-2-carboxylic acid which is further purified through recrystallization from acetic acid.

In a similar manner, 5-(acetoxy)-thioxanthone-2-carboxylic acid is prepared.

Upon substitution of the appropriate alkanoyl chloride in the above procedures, the other 5- and 7-esters can be prepared, e.g.
5-(propionyloxy)-thioxanthone-2-carboxylic acid,
7-(propionyloxy)-thioxanthone-2-carboxylic acid,
5-(butyryloxy)-thioxanthone-2-carboxylic acid,
7-(butyryloxy)-thioxanthone-2-carboxylic acid,
5-(trichloroacetoxy)-thioxanthone-2-carboxylic acid,
7-(trichloroacetoxy)-thioxanthone-2-carboxylic acid,
5-(trimethylacetoxy)-thioxanthone-2-carboxylic acid,
7-(trimethylacetoxy)-thioxanthone-2-carboxylic acid,
5-(heptanoyloxy)-thioxanthone-2-carboxylic acid,
7-(heptanoyloxy)-thioxanthone-2-carboxylic acid,
5-(pentanoyloxy)-thioxanthone-2-carboxylic acid,
7-(pentanoyloxy)-thioxanthone-2-carboxylic acid,
5-(2-chloropropionyloxy)-thioxanthone-2-carboxylic acid,
7-(2-chloropropionyloxy)-thioxanthone-2-carboxylic acid, and so forth.

EXAMPLE 8

A mixture of 3.9 grams of 1,3-dicarbomethoxy-4-bromobenzene, 2.85 g. of p-(acetyl)-thiophenol, 1.1 g. of cuprous oxide, and 25 ml. of tetramethylurea is heated to 165°C and maintained thereat with stirring for 18 hours under a nitrogen atmosphere. After this time, the reaction mixture is diluted with water and extracted with ether. The extracts are dried and evaporated to give 1,3-dicarbomethoxy-4-(p-(acetyl)-thiophenyloxy)-benzene.

1,3-Dicarbomethoxy-4-(p-(acetyl)-thiophenyloxy)-benzene (3.5 grams) is dissolved in 50 ml. of ethanol and the mixture treated with 15 ml. of 4% aqueous potassium hydroxide solution. The reaction mixture is refluxed for 30 minutes, concentrated under reduced pressure, and acidified with dilute hydrochloric acid. The solid collected upon filtration is washed with water and dried to give 1,3-dicarboxy-4-(p-(acetyl)-thiophenyloxy)-benzene which is recrystallized from ethanol:water.

A solution of 3.2 g. of 1,3-dicarboxy-4-(p-(acetyl)-thiophenyloxy)-benzene in 30 ml. of concentrated sulfuric acid is warmed to 80°C. The mixture is then allowed to stand at room temperature for 16 hours after which time it is poured into ice water, filtered, washed and dried to give 7-(acetyl)-thioxanthone-2-carboxylic acid which is recrystallized from tetrahydrofuran:ethanol.

In a similar manner, the above described reactions can be conducted utilizing an alternate p-acyl phenol starting material to give the corresponding 7-(acyl)-thioxanthone-2-carboxylic acid products, e.g.
7-(formyl)-thioxanthone-2-carboxylic acid, 7-(propionyl)-thioxanthone-2-carboxylic acid,
7-(n-butyryl)-thioxanthone-2-carboxylic acid,
7-(isobutyryl)-thioxanthone-2-carboxylic acid,
7-(n-pentanoyl)-thioxanthone-2-carboxylic acid,
7-(isopentanoyl)-thioxanthone-2-carboxylic acid,
7-(sec-pentanoyl)-thioxanthone-2-carboxylic acid,
7-(t-pentanoyl)-thioxanthone-2-carboxylic acid,
7-(hexanoyl)-thioxanthone-2-carboxylic acid,
7-(heptanoyl)-thioxanthone-2-carboxylic acid,
7-(octanoyl)-thioxanthone-2-carboxylic acid,
7-(nonanoyl)-thioxanthone-2-carboxylic acid,
7-(cyclopropylcarbonyl)-thioxanthone-2-carboxylic acid,
7-(cyclobutylcarbonyl)-thioxanthone-2-carboxylic acid,
7-(cyclopentylcarbonyl)-thioxanthone-2-carboxylic acid,
7-(cyclohexylcarbonyl)-thioxanthone-2-carboxylic acid,
7-(haloacetyl)-thioxanthone-2-carboxylic acid,
7-(benzoyl)-thioxanthone-2-carboxylic acid,
7-(substituted benzoyl)-thioxanthone-2-carboxylic acid,
7-(heterocycliccarbonyl)-thioxanthone-2-carboxylic acid, and the 10-oxo and 10,10-dioxo derivatives thereof.

The procedure of Example 8 is repeated using the appropriate o-(acyl)-thiophenol starting compounds to prepare the corresponding 5-(substituted)-thioxanthone-2-carboxylic acid, to wit, 5-(formyl)-thioxanthone-2-carboxylic acid, 5-(acetyl)-thioxanthone-2-carboxylic acid, 5-(propionyl)-thioxanthone-2-carboxylic acid, 5-(n-butyryl)-thioxanthone-2-carboxylic acid, 5-(isobutyryl)-thioxanthone-2-carboxylic acid, and so forth.

EXAMPLE 9

To a solution of 25 grams of thioxanthone-2-carboxylic acid in 200 ml. of triethylene glycol are added 18 g. of potassium hydroxide and 12.1 g. of 95% hydrazine. The resultant mixture is heated to reflux (155°C) and maintained thereat for one hour. The distillate is removed and the temperature is held at a temperature of about 200°C for 2 hours. The mixture is then cooled to 68°C and 200 ml. of water is added and the resultant solution poured into 110 ml. of water containing 60 ml. of concentrated hydrochloric acid. The resultant mixture is heated to 90°C, cooled to room temperature and filtered to give thioxanthene-2-carboxylic acid.

Twenty-six grams of thioxanthene-2-carboxylic acid is added to 400 ml. of absolute methanol. To the resultant solution are added 18 ml. of concentrated sulfuric acid and the mixture is then heated at reflux for about 2 hours. The mixture is then cooled to 40°C and sufficient water is added to bring the total volume to 1400 ml. The resultant mixture is then filtered to give methyl thioxanthene-2-carboxylate.

A mixture of 13.0 g. of methyl thioxanthene-2-carboxylate in 200 ml. of dichloroethane is cooled to −5°C and to the cooled solution are added 4.95 ml. of acetyl chloride and then 17.0 g. of aluminum trichloride. The resultant solution is stirred at room temperature for 1.75 hours. After this time, the solution is poured into a mixture of 300 g. of ice, 700 ml. of water, and 20 ml. of concentrated hydrochloric acid. The mixture is then extracted with three 500 ml. portions of methylene chloride. The combined extracts are washed with 10% aqueous potassium hydroxide solution and the washed solution evaporated to give methyl 7-(acetyl)-thioxanthene-2-carboxylate.

To a solution of 1.42 g. of methyl 7-(acetyl)-thioxanthene-2-carboxylate in 120 ml. of benzene are added 12.5 g. of manganese dioxide. The resultant mixture is stirred at room temperature for 16 hours after which time the mixture is filtered and stripped of solvent to give methyl 7-(acetyl)-thioxanthone-2-carboxylate which is recrystallized from methanol (displacement from methylene chloride solution).

A solution of 2 g. of methyl 7-(acetyl)-thioxanthone-2-carboxylate in 200 ml. of 10% aqueous, 10% potassium hydroxide in methanol is heated at reflux under a nitrogen atmosphere for 45 minutes. After this time, 20 ml. of water are added and the resultant mixture heated at reflux for 35 minutes. Water (300 ml.) is then added and the resultant mixture acidified and filtered to give 7-(acetyl)-thioxanthone-2-carboxylic acid.

10-Oxo-7-(acetyl)-thioxanthone-2-carboxylic acid and 10,10-dioxo-7-(acetyl)-thioxanthone-2-carboxylic acid are also thus prepared.

EXAMPLE 10

The procedure of Example 9 is repeated employing, in the procedure of the third paragraph thereof, the acyl chlorides (prepared from the corresponding acids upon treatment with thionyl chloride or oxalyl chloride) listed in Column A below to prepare the corresponding acid products listed in Column B below, through their respective methyl esters.

| Column A | Column B |
| --- | --- |
| propionyl chloride | 7-(propionyl)-thioxanthone-2-carboxylic acid |
| n-butyryl chloride | 7-(n-butyryl)-thioxanthone-2-carboxylic acid |
| isobutyryl chloride | 7-(isobutyryl)-thioxanthone-2-carboxylic acid |
| n-pentanoyl chloride | 7-(n-pentanoyl)-thioxanthone-2-carboxylic acid |
| isopentanoyl chloride | 7-(isopentanoyl)-thioxanthone-2-carboxylic acid |
| sec-pentanoyl chloride | 7-(sec-pentanoyl)-thioxanthone-2-carboxylic acid |
| t-pentanoyl chloride | 7-(t-pentanoyl)-thioxanthone-2-carboxylic acid |
| n-hexanoyl chloride | 7-(n-hexanoyl)-thioxanthone-2-carboxylic acid |
| n-heptanoyl chloride | 7-(n-heptanoyl)-thioxanthone-2-carboxylic acid |
| n-octanoyl chloride | 7-(n-octanoyl)-thioxanthone-2-carboxylic acid |
| n-nonanoyl chloride | 7-(n-nonanoyl)-thioxanthone-2-carboxylic acid |
| cyclopropylcarbonyl chloride | 7-(cyclopropylcarbonyl)-thioxanthone-2-carboxylic acid |
| cyclobutylcarbonyl chloride | 7-(cyclobutylcarbonyl)-thioxanthone-2-carboxylic acid |
| cyclopentylcarbonyl chloride | 7-(cyclopentylcarbonyl)-thioxanthone-2-carboxylic acid |
| cyclohexylcarbonyl chloride | 7-(cyclohexylcarbonyl)-thioxanthone-2-carboxylic acid |

| Column A | Column B |
| --- | --- |
| BENZOYL CHLORIDE | 7-(benzoyl)-thioxanthone-2-carboxylic acid |
| p-chlorobenzoyl chloride | 7-(p-chlorobenzoyl)-thioxanthone-2-carboxylic acid |
| p-methylbenzoyl chloride | 7-(p-methylbenzoyl)-thioxanthone-2-carboxylic acid |
| p-methoxybenzoyl chloride | 7-(p-methoxybenzoyl)-thioxanthone-2-carboxylic acid |
| p-thiomethoxybenzoyl chloride | 7-(p-thiomethoxybenzoyl)-thioxanthone-2-carboxylic acid |
| furoyl chloride | 7-(furoyl)-thioxanthone-2-carboxylic acid |
| pyrroyl chloride | 7-(pyrroyl)-thioxanthone-2-carboxylic acid |
| thenoyl chloride | 7-thenoyl-thioxanthone-2-carboxylic acid |
| pyridylcarbonyl chloride | 7-(pyridylcarbonyl)-thioxanthone-2-carboxylic acid |
| imidazolylcarbonyl chloride | 7-(imidazolylcarbonyl)-thioxanthone-2-carboxylic acid |
| oxazolylcarbonyl chloride | 7-oxazolylcarbonyl)-thioxanthone-2-carboxylic acid |

The 10-oxo and 10,10-dioxo compounds of the compounds of Column B are prepared upon oxidation as described in Example 5A.

The foregoing is practiced using the corresponding acyl bromide starting compounds, with similar results.

EXAMPLE 11

A mixture of 1.077 grams of methyl 7-(acetyl)-thioxanthone-2-carboxylate, 200 mg. of sodium borohydride and 150 ml. of tetrahydrofuran is stirred for 2.5 hours at room temperature. The reaction is monitored by tlc. After this period of time, a 5% aqueous acetic acid solution is added to the reaction mixture dropwise to neutrality and the resultant solution evaporated under vacuum and crystallized by the addition of ethanol and hot water. The precipitate is filtered off, washed and dried to give methyl 7-(1-hydroxyethyl)-thioxanthone-2-carboxylate.

A mixture of 860 mg. of methyl 7-(1-hydroxyethyl)-thioxanthone-2-carboxylate, 60 ml. of ethanol and 2 ml. of 2N sodium hydroxide is refluxed for 30 minutes. The resultant mixture is cooled, acidified and the precipitate is filtered off, washed, and dried to give 7-(1-hydroxyethyl)-thioxanthone-2-carboxylic acid.

10-Oxo-7-(1-hydroxyethyl)-thioxanthone-2-carboxylic acid and 10,10-dioxo-7-(1-hydroxyethyl)-thioxanthone-2-carboxylic acid are also thus prepared.

The foregoing procedures are practiced upon the other 7-acyl methyl esters prepared as described in Example 10 to give the following products, through their respective methyl esters:

7-(1-hydroxy-n-propyl)-thioxanthone-2-carboxylic acid,
7-(1-hydroxy-n-butyl)-thioxanthone-2-carboxylic acid,
7-(1-hydroxyisobutyl)-thioxanthone-2-carboxylic acid,
7-(1-hydroxy-n-pentyl)-thioxanthone-2-carboxylic acid,
7-(1-hydroxy-isopentyl)-thioxanthone-2-carboxylic acid,
7-(1-hydroxy-sec-pentyl)-thioxanthone-2-carboxylic acid,
7-(1-hydroxy-t-pentyl)-thioxanthone-2-carboxylic acid,
7-(1-hydroxy-n-hexyl)-thioxanthone-2-carboxylic acid,
7-(1-hydroxy-n-heptyl)-thioxanthone-2-carboxylic acid,
7-(1-hydroxy-n-octyl)-thioxanthone-2-carboxylic acid,
7-(1-hydroxy-n-nonyl)-thioxanthone-2-carboxylic acid,
7-((cyclopropyl)hydroxymethyl)-thioxanthone-2-carboxylic acid,
7-((cyclobutyl)hydroxymethyl)-thioxanthone-2-carboxylic acid,
7-((cyclopentyl)hydroxymethyl)-thioxanthone-2-carboxylic acid,
7-((cyclohexyl)hydroxymethyl)-thioxanthone-2-carboxylic acid,
7-(hydroxymethyl)-thioxanthone-2-carboxylic acid,
7-((phenyl)hydroxymethyl)-thioxanthone-2-carboxylic acid,
7-((p-chlorophenyl)hydroxymethyl)-thioxanthone-2-carboxylic acid,
7-((p-methylphenyl)hydroxymethyl)-thioxanthone-2-carboxylic acid,
7-((p-methoxyphenyl)hydroxymethyl)-thioxanthone-2-carboxylic acid,
7-((p-thiomethoxyphenyl)hydroxymethyl)-thioxanthone-2-carboxylic acid,
7-((furyl)hydroxymethyl)-thioxanthone-2-carboxylic acid,
7-((pyrryl)hydroxymethyl)-thioxanthone-2-carboxylic acid,
7-((thienyl)hydroxymethyl)-thioxanthone-2-carboxylic acid,
7-((pyridyl)hydroxymethyl)-thioxanthone-2-carboxylic acid,
7-((imidazolyl)hydroxymethyl)-thioxanthone-2-carboxylic acid,
7-((oxazolyl)hydroxymethyl)-thioxanthone-2-carboxylic acid, and the 10-oxo and 10,10-dioxo derivatives thereof.

EXAMPLE 12

A solution of 4.1 grams of methyl 7-(acetyl)-thioxanthone-2-carboxylate in 120 ml. of tetrahydrofuran is stirred at 0°C and 6.8 ml. of 3M methylmagnesium bromide solution in ether are added dropwise. After stirring at 0°C for 30 minutes, the reaction mixture is left to warm up to room temperature. A saturated ammonium chloride solution (50 ml.) is then added and the mixture is concentrated in vacuo. Extraction with ethyl acetate followed by evaporation yields methyl 7-(1-hydroxy-1-methylethyl)-thioxanthone-2-carboxylate.

The foregoing procedure is practiced upon the other 7-acyl methyl esters prepared as described in Example 10 to give the following products, through their respective methyl esters:

7-(1-hydroxy-1-methyl-n-propyl)-thioxanthone-2-carboxylate acid,
7-(1-hydroxy-1-methyl-n-butyl)-thioxanthone-2-carboxylic acid, 7-(1-hydroxy-1-methyl-isobutyl)-thioxanthone-2-carboxylic acid,
7-(1-hydroxy-1-methyl-n-pentyl)-thioxanthone-2-carboxylic acid,
7-(1-hydroxy-1-methyl-isopentyl)-thioxanthone-2-carboxylic acid,
7-(1-hydroxy-1-methyl-sec-pentyl)-thioxanthone-2-carboxylic acid,
7-(1-hydroxy-1-methyl-t-pentyl)-thioxanthone-2-carboxylic acid,
7-(1-hydroxy-1-methyl-n-hexyl)-thioxanthone-2-carboxylic acid,
7-(1-hydroxy-1-methyl-n-heptyl)-thioxanthone-2-carboxylic acid,
7-(1-hydroxy-1-methyl-n-octyl)-thioxanthone-2-carboxylic acid,
7-(1-hydroxy-1-methyl-n-nonyl)-thioxanthone-2-carboxylic acid,
7-(1-hydroxy-1-cyclopropylethyl)-thioxanthone-2-carboxylic acid,
7-(1-hydroxy-1-cyclobutylethyl)-thioxanthone-2-carboxylic acid,
7-(1-hydroxy-1-cyclopentylethyl)-thioxanthone-2-carboxylic acid,
7-(1-hydroxy-1-cyclohexylethyl)-thioxanthone-2-carboxylic acid,
7-(1-hydroxy-1-methylethyl)-thioxanthone-2-carboxylic acid,
7-(1-hydroxy-1-phenylethyl)-thioxanthone-2-carboxylic acid,
7-(1-hydroxy-1-p-chlorophenylethyl)-thioxanthone-2-carboxylic acid,
7-(1-hydroxy-1-p-methylphenylethyl)-thioxanthone-2-carboxylic acid,
7-(1-hydroxy-1-p-methoxyphenylethyl)-thioxanthone-2-carboxylic acid,
7-(1-hydroxy-1-p-thiomethoxyphenylethyl)-thioxanthone-2-carboxylic acid,
7-(1-hydroxy-1-furylethyl)-thioxanthone-2-carboxylic acid,
7-(1-hydroxy-1-pyrrylethyl)-thioxanthone-2-carboxylic acid,
7-(1-hydroxy-1-thienylethyl)-thioxanthone-2-carboxylic acid,
7-(1-hydroxy-1-pyridylethyl)-thioxanthone-2-carboxylic acid,
7-(1-hydroxy-1-imidazolylethyl)-thioxanthone-2-carboxylic acid,
7-(1-hydroxy-1-oxazolylethyl)-thioxanthone-2-carboxylic acid, and the 10-oxo and 10,10-dioxo compounds thereof.

EXAMPLE 13

The procedure of Example 12 is repeated employing, in lieu of methyl magnesium bromide, the reagents listed in Column C below to prepare the products listed in Column D below:

| Column C | Column D |
| --- | --- |
| ethylmagnesium bromide | 7-(1-hydroxy-1-ethylethyl)-thioxanthone-2-carboxylic acid |
| | 7-(1-ethyl-n-propyl)-thioxanthone-2-carboxylic acid, and so forth |
| n-propylmagnesium bromide | 7-(1-hydroxy-1-n-propylethyl)-thioxanthone-2-carboxylic acid |
| | 7-(1-hydroxy-1-n-propyl-n-propyl)-thioxanthone-2-carboxylic acid, and so forth |
| isopropylmagnesium bromide | 7-(1-hydroxy-1-isopropylethyl)-thioxanthone-2-carboxylic acid |
| | 7-(1-hydroxy-1-isopropyl-n-propyl)-thioxanthone-2-carboxylic acid, and so forth |
| n-butylmagnesium bromide | 7-(1-hydroxy-1-n-butylethyl)-thioxanthone-2-carboxylic acid |
| | 7-(1-hydroxy-1-n-butyl-n-propyl)-thioxanthone-2-carboxylic acid, and so forth |
| isobutylmagnesium bromide | 7-(1-hydroxy-1-isobutylethyl)-thioxanthone-2-carboxylic acid |
| | 7-(1-hydroxy-1-isobutyl-n-propyl)-thioxanthone-2-carboxylic acid, and so forth |
| sec-butylmagnesium bromide | 7-(1-hydroxy-1-sec-butylethyl)-thioxanthone-2-carboxylic acid |
| | 7-(1-hydroxy-1-sec-butyl-n-propyl)-thioxanthone-2-carboxylic acid, and so forth |
| t-butylmagnesium bromide | 7-(1-hydroxy-1-t-butylethyl)-thioxanthone-2-carboxylic acid |
| | 7-(1-hydroxy-1-t-butyl-n-propyl)-thioxanthone-2-carboxylic acid, and so forth |
| n-pentylmagnesium bromide | 7-(1-hydroxy-1-n-pentylethyl)-thioxanthone-2-carboxylic acid |
| | 7-(1-hydroxy-1-n-pentyl-n-propyl)-thioxanthone-2-carboxylic acid, and so forth |
| hexylmagnesium bromide | 7-(1-hydroxy-1-hexylethyl)-thioxanthone-2-carboxylic acid |
| | 7-(1-hydroxy-1-hexyl-n-propyl)-thioxanthone-2-carboxylic acid, and so forth |
| heptylmagnesium bromide | 7-(1-hydroxy-1-heptylethyl)-thioxanthone-2-carboxylic acid |
| | 7-(1-hydroxy-1-heptyl-n-propyl)-thioxanthone-2-carboxylic acid, and so forth |
| octylmagnesium bromide | 7-(1-hydroxy-1-octylethyl)-thioxanthone-2-carboxylic acid |
| | 7-(1-hydroxy-1-octyl-n-propyl)-thioxanthone-2-carboxylic acid, and so forth |
| cyclopropylmagnesium bromide | 7-(1-hydroxy-1-cyclopropylethyl)-thioxanthone-2-carboxylic acid |
| | 7-(1-hydroxy-1-cyclopropyl-n-propyl)-thioxanthone-2-carboxylic acid, and so forth |
| cyclobutylmagnesium bromide | 7-(1-hydroxy-1-cyclobutylethyl)-thioxanthone-2-carboxylic acid |
| | 7-(1-hydroxy-1-cyclobutyl-n-propyl)-thioxanthone-2-carboxylic acid, and so forth |
| cyclopentylmagnesium bromide | 7-(1-hydroxy-1-cyclopentylethyl)-thioxanthone-2-carboxylic acid |
| | 7-(1-hydroxy-1-cyclopentyl-n-propyl)-thioxanthone-2-carboxylic acid, and so forth |
| cyclohexylmagnesium bromide | 7-(1-hydroxy-1-cyclohexylethyl)-thioxanthone-2-carboxylic acid |

-Continued

| Column C | Column D |
|---|---|
| | 7-(1-hydroxy-1-cyclohexyl-n-propyl)-thioxanthone-2-carboxylic acid, and so forth | and the 10-oxo and 10,10-dioxo compounds thereof.

EXAMPLE 14

Methyl 5-(acetyl)-thioxanthone-2-carboxylate is treated in accordance with the procedure of the first paragraph of Example 11 to give methyl 5-(1-hydroxyethyl)-thioxanthone-2-carboxylate which is hydrolyzed in accordance with the second paragraph thereof to give 5-(1-hydroxyethyl)-thioxanthone-2-carboxylic acid.

The foregoing procedures can be followed with other 5-acyl methyl esters prepared as described in Example 8 to give the corresponding 5-(1-hydroxyalkyl) compounds through their methyl esters, and the 10-oxo and 10,10-dioxo compounds thereof.

EXAMPLE 15

Methyl 5-(acetyl)-thioxanthone-2-carboxylic acid is treated in accordance with the procedure of the first paragraph of Example 12 to give methyl 5-(1-hydroxy-1-methylethyl)-thioxanthone-2-carboxylate which is hydrolyzed in accordance with the second paragraph thereof to give 5-(1-hydroxy-1-methylethyl)-thioxanthone-2-carboxylic acid.

The foregoing procedure is practiced upon the other 5-acyl methyl esters prepared as described in Example 8 to give the corresponding C-5 products through their respective methyl esters, and the 10-oxo and 10,10-dioxo compounds thereof.

EXAMPLE 16

The procedure of Example 15 is repeated employing, in lieu of methyl magnesium bromide, the reagents listed in Column C of Example 13 to prepare the corresponding C-5 products of those listed in Column D of Example 13.

EXAMPLE 17

A mixture of 2 g. of 7-(1-hydroxyethyl)-thioxanthone-2-carboxylic acid in 8 ml. of pyridine and 4 ml. of acetyl chloride is heated at steam bath temperatures for 1 hour. The mixture is then poured into HCl/ice water and the solid which forms is collected by filtration, washed with water and dried to yield 7-(1-acetoxyethyl)-thioxanthone-2-carboxylic acid.

In a similar manner, 5-(1-acetoxyethyl)-thioxanthone-2-carboxylic acid is prepared.

Upon substitution of the appropriate acyl chloride in the above procedure and, in addition, employing as starting compounds the products listed in Examples 11 and 14, the following compounds are prepared:
7-(1-propionyloxyethyl)-thioxanthone-2-carboxylic acid,
5-(1-propionyloxyethyl)-thioxanthone-2-carboxylic acid,
7-(1-butyryloxyethyl)-thioxanthone-2-carboxylic acid,
5-(1-butyryloxyethyl)-thioxanthone-2-carboxylic acid,
7-(1-acetoxy-n-propyl)-thioxanthone-2-carboxylic acid,
5-(1-acetoxy-n-propyl)-thioxanthone-2-carboxylic acid, and so forth,
7-(1-acetoxy-n-butyl)-thioxanthone-2-carboxylic acid,
5-(1-acetoxy-n-butyl)-thioxanthone-2-carboxylic acid, and so forth,
7-(1-acetoxyisobutyl)-thioxanthone-2-carboxylic acid,
5-(1-acetoxyisobutyl)-thioxanthone-2-carboxylic acid, and so forth,
7-((cyclopropyl)acetoxymethyl)-thioxanthone-2-carboxylic acid,
5-((cyclopropyl)acetoxymethyl)-thioxanthone-2-carboxylic acid, and so forth,
7-((phenyl)acetoxymethyl)-thioxanthone-2-carboxylic acid,
5-((phenyl)acetoxymethyl)-thioxanthone-2-carboxylic acid, and so forth, and the 10-oxo and 10,10-dioxo compounds thereof.

EXAMPLE 18

A mixture of 2 g. of 7-(1-hydroxy-1-methylethyl)-thioxanthone-2-carboxylic acid, 15 ml. of tetrahydrofuran, 5 ml. of dimethylaniline, and 5 ml. of acetyl chloride is refluxed for six hours. The mixture is then concentrated in vacuo to remove a portion of the tetrahydrofuran. Dilute HCl is added, the mixture is filtered, washed and dried to give 7-(1-acetoxy-1-methylethyl)-thioxanthone-2-carboxylic acid.

In a similar maner, 5-(1-acetoxy-1-methylethyl)-thioxanthone-2-carboxylic acid is prepared.

Upon substitution of the appropriate acyl chloride in the above procedure and, in addition, employing as starting compounds the products listed in Examples 12, 13, 15 and 16, the following compounds are prepared:
7-(1-acetoxy-1-methyl-n-propyl)-thioxanthone-2-carboxylic acid,
7-(1-acetoxy-1-methyl-isobutyl)-thioxanthone-2-carboxylic acid,
7-(1-propionyloxy-1-methyl-n-propyl)-thioxanthone-2-carboxylic acid,
7-(1-propionyloxy-1-methyl-isobutyl)-thioxanthone-2-carboxylic acid,
5-(1-acetoxy-1-methyl-n-propyl)-thioxanthone-2-carboxylic acid,
5-(1-acetoxy-1-methyl-isobutyl)-thioxanthone-2-carboxylic acid,
5-(1-propionyloxy-1-methyl-n-propyl)-thioxanthone-2-carboxylic acid, and
5-(1-propionyloxy-1-methyl-isobutyl)-thioxanthone-2-carboxylic acid,
and the 10-oxo and 10,10-dioxo compounds thereof.

EXAMPLE 19

To a mixture of 2.5 g. of methyl 7-(1-hydroxyethyl)-thioxanthone-2-carboxylate and 500 mg. of sodium hydride in 45 ml. of dimethylformamide is added 2 ml. of methyl iodide and the mixture is stirred at room temperature for 16 hours. The mixture is then poured into dilute HCl/ice water, filtered and dried to give methyl 7-(1-methoxyethyl)-thioxanthone-2-carboxylate.

The resultant product is hydrolyzed to give 7-(1-methoxyethyl)-thioxanthone-2-carboxylic acid.

In a similar manner, 5-(1-methoxyethyl)-thioxanthone-2-carboxylic acid is prepared.

Upon substitution of the appropriate alkyl or cycloalkyl iodide or bromide and, in addition, employing as starting compounds the products listed in Examples 11 and 14, the following compounds are prepared, through their respective esters:

7-(1-ethoxyethyl)-thioxanthone-2-carboxylic acid,
5-(1-ethoxyethyl)-thioxanthone-2-carboxylic acid,
7-(1-n-propoxyethyl)-thioxanthone-2-carboxylic acid,
5-(1-n-propoxyethyl)-thioxanthone-2-carboxylic acid,
7-(1-isopropoxyethyl)-thioxanthone-2-carboxylic acid,
5-(1-isopropoxyethyl)-thioxanthone-2-carboxylic acid,
7-(1-cyclopentyloxyethyl)-thioxanthone-2-carboxylic acid,
5-(1-cyclopentyloxyethyl)-thioxanthone-2-carboxylic acid,
7-(1-methoxy-n-propyl)-thioxanthone-2-carboxylic acid,
5-(1-methoxy-n-propyl)-thioxanthone-2-carboxylic acid, and so forth,
7-(1-methoxy-n-butyl)-thioxanthone-2-carboxylic acid,
5-(1-methoxy-n-butyl)-thioxanthone-2-carboxylic acid, and so forth,
7-(1-methoxyisobutyl)-thioxanthone-2-carboxylic acid,
5-(1-methoxyisobutyl)-thioxanthone-2-carboxylic acid, and so forth,
7-((cyclopropyl)methoxymethyl)-thioxanthone-2-carboxylic acid,
5-((cyclopropyl)methoxymethyl)-thioxanthone-2-carboxylic acid, and so forth,
7-((phenyl)methoxymethyl)-thioxanthone-2-carboxylic acid,
5-((phenyl)methoxymethyl)-thioxanthone-2-carboxylic acid, and
7-(1-methoxy-1-methylethyl)-thioxanthone-2-carboxylic acid,
5-(1-methoxy-1-methylethyl)-thioxanthone-2-carboxylic acid, and so forth, and the 10-oxo and 10,10-dioxo compounds thereof.

EXAMPLE 20

A solution of 4.1 g. of methyl 7-(acetyl)-thioxanthone-2-carboxylate in 120 ml. of tetrahydrofuran is stirred at 0°C and 6.8 ml. of 3M methylmagnesium bromide solution in ether are added dropwise. After stirring at 0°C for 30 minutes, 2 ml. of methyl iodide and 30 ml. of hexamethylphosphoramide are added and the mixture is stirred at room temperature for 5 hours. A saturated ammonium chloride solution (50 ml.) is then added and the mixture is concentrated in vacuo. Extraction with ethyl acetate followed by evaporation yields methyl 7-(1-methoxy-1-methylethyl)-thioxanthone-2-carboxylate. Hydrolysis provides 7-(1-methoxy-1-methylethyl)-thioxanthone-2-carboxylic acid.

Likewise, 5-(1-methoxy-1-methylethyl)-thioxanthone-2-carboxylic acid is prepared.

Upon substituting the appropriate alkyl or cycloalkyl bromide and, in addition, using the other starting materials listed in Example 10, the following compounds are prepared:

7-(1-ethoxy-1-methylethyl)-thioxanthone-2-carboxylic acid,
5-(1-ethoxy-1-methylethyl)-thioxanthone-2-carboxylic acid,
7-(1-propoxy-1-methylethyl)-thioxanthone-2-carboxylic acid,
5-(1-propoxy-1-methylethyl)-thioxanthone-2-carboxylic acid,
7-(1-cyclopentyloxy-1-methylethyl)-thioxanthone-2-carboxylic acid,
5-(1-cyclopentyloxy-1-methylethyl)-thioxanthone-2-carboxylic acid,
7-(1-methoxy-1-methyl-n-propyl)-thioxanthone-2-carboxylic acid,
5-(1-methoxy-1-methyl-n-propyl)-thioxanthone-2-carboxylic acid, and so forth,
7-(1-methoxy-1-methyl-isobutyl)-thioxanthone-2-carboxylic acid,
5-(1-methoxy-1-methyl-isobutyl)-thioxanthone-2-carboxylic acid, and so forth,
7-(1-methoxy-1-cyclopentylethyl)-thioxanthone-2-carboxylic acid,
5-(1-methoxy-1-cyclopentylethyl)-thioxanthone-2-carboxylic acid, and so forth,
7-(1-methoxy-1-phenylethyl)-thioxanthone-2-carboxylic acid,
5-(1-methoxy-1-phenylethyl)-thioxanthone-2-carboxylic acid, and so forth, and the 10-oxo and 10,10-dioxo compounds thereof.

EXAMPLE 21

A mixture of 1.6 g. of methyl 7-(1-hydroxyethyl)-thioxanthone-2-carboxylate, 50 ml. of methylene chloride, 50 ml. of isobutene and 2 ml. of $BF_3/H_3PO_4$ catalyst are shaken in a pressure bottle for four days at room temperature. The reaction mixture is diluted with methylene chloride, washed with bicarbonate solution, then water, dried and evaporated and crystallized from methanol to give methyl 7-(1-t-butoxyethyl)-thioxanthone-2-carboxylate.

Hydrolysis provides 7-(1-t-butoxyethyl)-thioxanthone-2-carboxylic acid.

Likewise, 5(1-t-butoxyethyl)-thioxanthone-2-carboxylic acid is prepared.

Likewise, the following products are prepared from the respective starting compounds:

7-(1-t-butoxy-n-propyl)-thioxanthone-2-carboxylic acid,
5-(1-t-butoxy-n-propyl)-thioxanthone-2-carboxylic acid,
7-(1-t-butoxy-isobutyl)-thioxanthone-2-carboxylic acid,
5-(1-t-butoxy-isobutyl)-thioxanthone-2-carboxylic acid,
7-((cyclopropyl)-t-butoxymethyl)-thioxanthone-2-carboxylic acid,
5-((cyclopropyl)-t-butoxymethyl)-thioxanthone-2-carboxylic acid,
7-((phenyl)-t-butoxymethyl)-thioxanthone-2-carboxylic acid,
5-((phenyl)-t-butoxymethyl)-thioxanthone-2-carboxylic acid,
7-(1-t-butoxy-1-methylethyl)-thioxanthone-2-carboxylic acid,
5-(1-t-butoxy-1-methylethyl)-thioxanthone-2-carboxylic acid, and so forth, and the 10-oxo and 10,10-dioxo compounds thereof.

EXAMPLE 22

Ten milliliters of dihydropyran are added to a solution of 1 g. of methyl 7-(1-hydroxyethyl)-thioxanthone-2-carboxylate in 50 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is crystallized from chloroform/methanol/pyridine to yield methyl 7-(1-tetrahydropyran-2'-yloxyethyl)-thioxanthone-2-carboxylate.

Methyl 7-(1-tetrahydropyran-2'-yloxy-1-methylethyl)-thioxanthone-2-carboxylate is prepared from methyl 7-(1-hydroxy-1-methylethyl)-thioxanthone-2-carboxylate by conducting the above reaction at reflux for two hours.

Hydrolysis provides 7-(1-tetrahydropyran-2'-yloxyethyl)-thioxanthone-2-carboxylic acid and 7-(1-tetrahydropyran-2'-yloxy-1-methylethyl)-thioxanthone-2-carboxylic acid, respectively.

In like manner, 5-(1-tetrahydropyran-2'-yloxyethyl)-thioxanthone-2-carboxylic acid is prepared. By use of dihydrofuran in the above procedure, 7-(1-tetrahydrofuran-2'-yloxyethyl)-thioxanthone-2-carboxylic acid, 7-(1-tetrahydrofuran-2'-yloxy-1-methylethyl)-thioxanthone-2-carboxylic acid, 5-(1-tetrahydrofuran-2'-yloxyethyl)-thioxanthone-2-carboxylic acid, and 5-(1-tetrahydrofuran-2'-yloxy-1-methylethyl)-thioxanthone-2-carboxylic acid are prepared.

In like manner, the following compounds are prepared:

7-(1-tetrahydropyran-2'-yloxy-n-propyl)-thioxanthone-2-carboxylic acid, 7-(1-tetrahydropyran-2'-yloxy-isobutyl)-thioxanthone-2-carboxylic acid, 7-(1-tetrahydropyran-2'-yloxy-1-ethylethyl)-thioxanthone-2-carboxylic acid, and the tetrahydrofuran-2'-yloxy and C-5 substituted compounds corresponding thereto.

Methyl 7-(1-hydroxyethyl)-thioxanthone-2-carboxylate (3.5 grams) in 150 ml. of benzene and 500 mg. of p-toluenesulfonic acid (dried by azeotropic distillation from benzene) are mixed together and the reaction mixture is treated with 4-methoxy-5,6-dihydro-2H-pyran, 1 ml. at a time until reaction is complete (followed by tlc). The reaction is quenched by addition of ½ ml. of triethylamine, washed with water, and crystallized with care from methanol containing pyridine to give methyl 7-(1-4'-methoxytetrahydropyran-4'-yloxyethyl)-thioxanthone-2-carboxylate.

Methyl 7-(1-4'-methoxytetrahydropyran-4'-yloxy-1-methylethyl)-thioxanthone-2-carboxylate is prepared from methyl 7-(1-hydroxy-1-methylethyl)-thioxanthone-2-carboxylate by conducting the above reaction at reflux for 2 hours.

Hydrolysis provides 7-(1-4'-methoxytetrahydropyran-4'-yloxyethyl)-thioxanthone-2-carboxylic acid and 7-(1-4'-methoxytetrahydropyran-4'-yloxy-1-methylethyl)-thioxanthone-2-carboxylic acid respectively.

A solution of 1.4 g. of aluminum chloride in 25 ml. of tetrahydrofuran is treated with a solution of 0.4 g. of lithium aluminum hydride in 100 ml. of ether. Methyl 7-(1-4'-methoxytetrahydropyran-4'-yloxyethyl)-thioxanthone-2-carboxylate (500 mg.) is extracted into the solution. After reduction is complete (monitored by tlc), saturated sodium chloride is added until a precipitate forms. This is filtered and the crude product is oxidized in acetic acid using excess sodium dichromate to give 7-(1-tetrahydropyran-4'-yloxyethyl)-thioxanthone-2-carboxylic acid.

In like manner, the following compounds are prepared:

5-(1-4'-methoxytetrahydropyran-4'-yloxyethyl)-thioxanthone-2-carboxylic acid, 5-(1-tetrahydropyran-4'-yloxyethyl)-thioxanthone-2-carboxylic acid, 7-(1-4'-ethoxytetrahydropyran-4'-yloxyethyl)-thioxanthone-2-carboxylic acid, 5-(1-4'-ethoxytetrahydropyran-4'-yloxyethyl)-thioxanthone-2-carboxylic acid, 7-(1-4'-methoxytetrahydropyran-4'-yloxyisobutyl)-thioxanthone-2-carboxylic acid, 5-(1-4'-methoxytetrahydropyran-4'-yloxyisobutyl)-thioxanthone-2-carboxylic acid, 7-(1-tetrahydropyran-4'-yloxy-1-methylethyl)-thioxanthone-2-carboxylic acid, 5-(1-tetrahydropyran-4'-yloxy-1-methylethyl)-thioxanthone-2-carboxylic acid, 7-(1-4'-propoxytetrahydropyran-4'-yloxy-n-propyl)-thioxanthone-2-carboxylic acid, and 5-(1-4'-propoxytetrahydropyran-4'-yloxy-n-propyl)-thioxanthone-2-carboxylic acid, and the 10-oxo and 10,10-dioxo compounds thereof.

EXAMPLE 23

A mixture of 4 grams of 7-(hydroxy)-thioxanthone-2-carboxylic acid (Example 6), 10 g. of methyl iodide, and 10 g. of lithium carbonate in 50 ml. of dimethylformamide is stirred at room temperature for a period of 16 hours. After this period of time, the reaction mixture is poured into dilute hydrochloric acid-ice and the resultant mixture extracted with ethyl acetate. The extracts are filtered through alumina to give methyl 7-(hydroxy)-thioxanthone-2-carboxylate which can be recrystallized from methanol.

To a solution of 6.2 g. of methyl 7-(hydroxy)-thioxanthone-2-carboxylate in 100 ml. of dimethylformamide are added 1 g. of sodium hydride. The mixture is stirred for ten minutes at room temperature under nitrogen. Dimethylthiocarbamoyl chloride (3 g.) is then added thereto and the resultant mixture stirred at 70°C for 6 hours and then at room temperature for 16 hours. The mixture is then poured into 200 ml. of water containing 1 ml. of acetic acid, the resultant mixture is filtered and the solid dried to give methyl 7-(dimethylthiocarbamoyloxy)-thioxanthone-2-carboxylate.

Methyl 7-(dimethylthiocarbamoyloxy)-thioxanthone-2-carboxylate (8 g.) in 150 ml. of sulfolane is stirred at 230°C under nitrogen. After a total of 6 hours under these conditions, tlc indicates the absence of starting material. The mixture is cooled to 80°C and 150 ml. of hot water are slowly added. The mixture is then cooled and the filtered solid washed with water and dried to give methyl 7-(dimethylcarbamoylthio)-thioxanthone-2-carboxylate.

Methyl 7-(dimethylcarbamoylthio)-thioxanthone-2-carboxylate (7.5 g.), 10 g. of potassium hydroxide and 250 ml. of 80% aqueous ethanol is refluxed for one hour. After this time, 250 ml. of water are added and the mixture is treated with charcoal, filtered, and acidified. The product is filtered off and dried to give 7-(mercapto)-thioxanthone-2-carboxylic acid.

In like manner, 5-(mercapto)-thioxanthone-2-carboxylic acid is prepared from methyl 5-(hydroxy)-thioxanthone-2-carboxylate.

EXAMPLE 24

A mixture of 3 grams of 7-(mercapto)-thioxanthone-2-carboxylic acid in 150 ml. of dimethylformamide, 5 ml. of methyl iodide and 5 ml. of potassium carbonate is stirred for 16 hours at 60°C. The mixture is then poured into dilute hydrochloric acid and the resultant mixture extracted with ethyl acetate. The extracts are chromatographed on alumina (methylene chloride) to give methyl 7-(methylthio)-thioxanthone-2-carboxylate (i.e. methyl 7-(thiomethoxy)-thioxanthone-2-carboxylate) which can be recrystallized from methylene chloride:methanol.

A mixture of 580 mg. of methyl 7-(methylthio)-thioxanthone-2-carboxylate, 30 ml. of ethanol, 5 ml. of saturated sodium carbonate solution and 5 ml. of water is refluxed for one hour. The mixture is then cooled, acidified and the precipitate filtered off to give 7-(methylthio)-thioxanthone-2-carboxylic acid (i.e. 7-(thiomethoxy)-thioxanthone-2-carboxylic acid) as also prepared in the alternative methods described above.

A mixture of 0.8 g. of 7-(mercapto)-thioxanthone-2-carboxylic acid, 2 ml. of 2-bromopropane, and excess potassium carbonate in 50 ml. of dimethylformamide is stirred 24 hours at 75°C. Dilute hydrochloric acid and ethanol are added, the solid filtered off and washed. The solid is saponified with sodium carbonate in aqueous methanol (30 minutes reflux). The alkaline solution is diluted with water, treated with charcoal, filtered, and acidified to give 7-(isopropylthio)-thioxanthone-2-carboxylic acid which can be recrystallized from tetrahydrofuran:ethyl acetate.

In a similar manner (and alternative to the method of Example 1), the following are prepared from the respective starting compounds:

5-(methylthio)-thioxanthone-2-carboxylic acid,
5-(isopropylthio)-thioxanthone-2-carboxylic acid,
7-(ethylthio)-thioxanthone-2-carboxylic acid,
5-(ethylthio)-thioxanthone-2-carboxylic acid,
7-(n-propylthio)-thioxanthone-2-carboxylic acid,
5-(n-propylthio)-thioxanthone-2-carboxylic acid,
7-(n-butylthio)-thioxanthone-2-carboxylic acid,
5-(n-butylthio)-thioxanthone-2-carboxylic acid,
7-(sec-butylthio)-thioxanthone-2-carboxylic acid,
5-(sec-butylthio)-thioxanthone-2-carboxylic acid,
7-(isobutylthio)-thioxanthone-2-carboxylic acid,
5-(isobutylthio)-thioxanthone-2-carboxylic acid,
7-(t-butylthio)-thioxanthone-2-carboxylic acid,
5-(t-butylthio)-thioxanthone-2-carboxylic acid,
7-(n-pentylthio)-thioxanthone-2-carboxylic acid,
5-(n-pentylthio)-thioxanthone-2-carboxylic acid,
7-(cyclopentylthio)-thioxanthone-2-carboxylic acid,
5-(cyclopentylthio)-thioxanthone-2-carboxylic acid, and the 10-oxo and 10,10-dioxo compounds thereof.

EXAMPLE 25

Methyl 7-(methylthio)-thioxanthone-2-carboxylate (764 mg.), 2 ml. of hydrogen peroxide (30%), and 40 ml. of acetic acid are stirred at 0°C for 90 minutes. Tlc indicates the absence of starting material. The mixture is diluted with 60 ml. of water, the solid is filtered off and dried to give methyl 7-(methylsulfonyl)-thioxanthone-2-carboxylate which can be recrystallized from acetic acid:water.

Methyl 7-(methylsulfonyl)-thioxanthone-2-carboxylate (660 mg.), 1 g. of potassium hydroxide, and 60 ml. of 80% aqueous ethanol are refluxed for 30 minutes. The mixture is filtered, acidified, and the solid filtered off to give 7-(methylsulfonyl)-thioxanthone-2-carboxylic acid.

In like manner, 5-(methylsulfonyl)-thioxanthone-2-carboxylic acid is prepared.

Likewise, from the respective starting compounds are prepared the following compounds:

7-(isopropylsulfonyl)-thioxanthone-2-carboxylic acid,
5-(isopropylsulfonyl)-thioxanthone-2-carboxylic acid,
7-(ethylsulfonyl)-thioxanthone-2-carboxylic acid,
5-(ethylsulfonyl)-thioxanthone-2-carboxylic acid,
7-(n-propylsulfonyl-thioxanthone-2-carboxylic acid,
5-(n-propylsulfonyl)-thioxanthone-2-carboxylic acid,
7-(n-butylsulfonyl)-thioxanthone-2-carboxylic acid,
5-(n-butylsulfonyl)-thioxanthone-2-carboxylic acid,
7-(sec-butylsulfonyl)-thioxanthone-2-carboxylic acid,
5-(sec-butylsulfonyl)-thioxanthone-2-carboxylic acid,
7-(isobutylsulfonyl)-thioxanthone-2-carboxylic acid,
5-(isobutylsulfonyl)-thioxanthone-2-carboxylic acid,
7-(t-butylsulfonyl)-thioxanthone-2-carboxylic acid,
5-(t-butylsulfonyl)-thioxanthone-2-carboxylic acid,
7-(n-pentylsulfonyl)-thioxanthone-2-carboxylic acid,
5-(n-pentylsulfonyl)-thioxanthone-2-carboxylic acid,
7-(cyclopentylsulfonyl)-thioxanthone-2-carboxylic acid,
5-(cyclopentylsulfonyl)-thioxanthone-2-carboxylic acid,
and the 10-oxo and 10,10-dioxo compounds thereof.

EXAMPLE 26

Methyl 7-(methylthio)-thioxanthone-2-carboxylate (927 mg.) in 60 ml. of methylene chloride is cooled to 0°C (ice). m-Chloroperbenzoic acid (555 mg.) is then added and the mixture is stirred at 0°C for 75 minutes. The reaction mixture is then filtered through alumina and washed with methylene chloride to give methyl 7-(methylsulfinyl)-thioxanthone-2-carboxylate which can be recrystallized from benzene:heptane.

Methyl 7-(methylsulfinyl)-thioxanthone-2-carboxylate (720 mg.), 75 ml. of ethanol, and 10 ml. of 5% sodium hydroxide are refluxed for 30 minutes. The mixture is cooled, partially evaporated and acidified. The precipitate is filtered off, washed and dried to give 7-(methylsulfinyl)-thioxanthone-2-carboxylic acid which can be recrystallized from acetic acid.

In like manner, 5-(methylsulfinyl)-thioxanthone-2-carboxylic acid is prepared.

Likewise, from the respective starting compounds are prepared the following compounds:

7-(isopropylsulfinyl)-thioxanthone-2-carboxylic acid,
5-(isopropylsulfinyl)-thioxanthone-2-carboxylic acid,
7-(ethylsulfinyl)-thioxanthone-2-carboxylic acid,
5-(ethylsulfinyl)-thioxanthone-2-carboxylic acid,
7-(n-propylsulfinyl)-thioxanthone-2-carboxylic acid, 5-(n-propylsulfinyl)-thioxanthone-2-carboxylic acid,
7-(n-butylsulfinyl)-thioxanthone-2-carboxylic acid,
5-(n-butylsulfinyl)-thioxanthone-2-carboxylic acid,
7-(sec-butylsulfinyl)-thioxanthone-2-carboxylic acid,
5-(sec-butylsulfinyl)-thioxanthone-2-carboxylic acid,
7-(isobutylsulfinyl)-thioxanthone-2-carboxylic acid,
5-(isobutylsulfinyl)-thioxanthone-2-carboxylic acid,
7-(t-butylsulfinyl)-thioxanthone-2-carboxylic acid,
5-(t-butylsulfinyl)-thioxanthone-2-carboxylic acid,
7-(n-pentylsulfinyl)-thioxanthone-2-carboxylic acid,
5-(n-pentylsulfinyl)-thioxanthone-2-carboxylic acid,
7-(cyclopentylsulfinyl)-thioxanthone-2-carboxylic acid,
5-(cyclopentylsulfinyl)-thioxanthone-2-carboxylic acid, and the 10-oxo and 10,10-dioxo compounds thereof.

The procedures of Examples 25 and 26 can be practiced upon the corresponding acid starting compounds to give the same products without the need of the hydrolysis step.

EXAMPLE 27

One gram of 7-(mercapto)-thioxanthone-2carboxylic acid is dissolved in 30 ml. of acetic acid containing 3 ml. of concentrated hydrochloric acid under warming. The solution is then saturated with chlorine gas and stirred at room temperature overnight. The solution is then diluted with water and the precipitate filtered off, washed, and dried to give 7-(chlorosulfonyl)-thioxanthone-2-carboxylic acid.

Likewise, 5-(chlorosulfonyl)-thioxanthone-2-carboxylic acid is prepared from 5-(mercapto)-thioxanthone-2-carboxylic acid.

The thus prepared chlorosulfonyl compounds are then treated with aqueous potassium hydroxide to give 7-(sulfo)-thioxanthone-2-carboxylic acid and 5-(sulfo)-thioxanthone-2-carboxylic acid.

The 10-oxo and 10,10-dioxo compounds corresponding to the above are also thus prepared.

EXAMPLE 28

A mixture of 1 gram of 7-(chlorosulfonyl)-thioxanthone-2-carboxylic acid, 2 ml. of concentrated aqueous ammonia, and 20 ml. of dioxane is stirred at room temperature overnight. The mixture is then diluted with water and the solid filtered off and dried to give 7-(sulfamoyl)-thioxanthone-2-carboxylic acid.

In like manner, 5-(sulfamoyl)-thioxanthone-2-carboxylic acid is prepared.

Upon substituting a primary amine, such as methylamine and ethylamine, or a secondary amine, such as dimethylamine and diethylamine, for ammonia in the above method, the corresponding C-5 and C-7 N-monolower alkylsulfamoyl and N,N-dilower alkylsulfamoyl products are obtained, e.g.

7-(methylsulfamoyl)-thioxanthone-2-carboxylic acid,
5-(methylsulfamoyl)-thioxanthone-2-carboxylic acid,
7-(ethylsulfamoyl)-thioxanthone-2-carboxylic acid,
5-(ethylsulfamoyl)-thioxanthone-2-carboxylic acid,
7-(n-propylsulfamoyl)-thioxanthone-2-carboxylic acid,
5-(n-propylsulfamoyl)-thioxanthone-2-carboxylic acid,
7-(isopropylsulfamoyl)-thioxanthone-2-carboxylic acid,
5-(isopropylsulfamoyl)-thioxanthone-2-carboxylic acid,
7-(dimethylsulfamoyl)-thioxanthone-2-carboxylic acid,
5-(dimethylsulfamoyl)-thioxanthone-2-carboxylic acid,
7-(diethylsulfamoyl)-thioxanthone-2-carboxylic acid,
5-(diethylsulfamoyl)-thioxanthone-2-carboxylic acid,
7-(di-n-propylsulfamoyl)-thioxanthone-2-carboxylic acid,
5-(di-n-propylsulfamoyl)-thioxanthone-2-carboxylic acid,
7-(di-isopropylsulfamoyl)-thioxanthone-2-carboxylic acid,
5-(di-isopropylsulfamoyl)-thioxanthone-2-carboxylic acid, and so forth,
and the 10-oxo and 10,10-dioxo compounds thereof.

EXAMPLE 29

A mixture of 15 grams of 2,4-dichlorobenzoic acid, 12 g. of p-mercaptobenzoic acid, 0.5 g. of copper powder and 20 g. of anhydrous potassium carbonate in 200 ml. of dimethylformamide is heated to 165°C and maintained thereat with stirring and under a nitrogen atmosphere. After monitoring via tlc indicates the reaction is substantially complete, the reaction mixture is diluted with water, treated with charcoal, filtered and the clear filtrate acidified. The precipitate is isolated by suction filtration, washed neutral and dried to give 2-(p-(carboxy)-phenylthio)-4-chlorobenzoic acid.

Two grams of 2-(p-(carboxy)-phenylthio)-4-chlorobenzoic acid in 20 ml. of concentrated sulfuric acid is stirred at 80°C for 1 hour. After this time, the reaction mixture is poured into 200 ml. of ice water and the resultant mixture is heated on a steam bath for 15 minutes. The mixture is cooled and filtered with the precipitate being washed with water and then recrystallized from acetic acid to give 6-(chloro)-thioxanthone-2-carboxylic acid.

EXAMPLE 30

6-(Chloro)-thioxanthone-2-carboxylic acid (2.5 g.) and 1.8 g. of sodium methyl mercaptide in 40 ml. of hexamethylphosphoramide (HMPA) is stirred for 2 hours at 100°C. After acidification, the product is filtered off, washed with water and dried to give 6-(methylthio)-thioxanthone-2-carboxylic acid.

In like manner, the following compounds can be prepared:
6-(ethylthio)-thioxanthone-2-carboxylic acid,
6-(n-propylthio)-thioxanthone-2-carboxylic acid,
6-(isopropylthio)-thioxanthone-2-carboxylic acid,
6-(n-butylthio)-thioxanthone-2-carboxylic acid,
6-(isobutylthio)-thioxanthone-2-carboxylic acid,
6-(sec-butylthio)-thioxanthone-2-carboxylic acid,
6-(t-butylthio)-thioxanthone-2-carboxylic acid,
6-(pentylthio)-thioxanthone-2-carboxylic acid,
6-(cyclopropylthio)-thioxanthone-2-carboxylic acid,
6-(cyclobutylthio)-thioxanthone-2-carboxylic acid, and
6-(cyclopentylthio)-thioxanthone-2-carboxylic acid.

The compound 6-(methoxy)-thioxanthone-2-carboxylic acid is prepared by employing sodium methoxide in the above procedure.

EXAMPLE 31

A mixture of 11 grams of 6-(methoxy)-thioxanthone-2-carboxylic acid in 100 ml. of concentrated aqueous hydrogen iodide and 100 ml. of acetic acid is refluxed for four hours. After this time, the mixture is cooled, diluted with water, and filtered. The precipitate is washed and dried to give 6-(hydroxy)-thioxanthone-2-carboxylic acid.

EXAMPLE 32

A mixture of 4 grams of 6-(hydroxy)-thioxanthone-2-carboxylic acid, 10 g. of methyl iodide, and 10 g. of lithium carbonate in 50 ml. of dimethylformamide is stirred at room temperature for a period of 16 hours. After this period of time, the reaction mixture is poured into dilute hydrochloric acid-ice and the resultant mixture extracted with ethyl acetate. The extracts are filtered through alumina to give methyl 6-(hydroxy)-thioxanthone-2-carboxylate which can be recrystallized from methanol.

The thus prepared compound when treated in accordance with the procedure of Examples 23 and 24 gives:
  6-(mercapto)-thioxanthone-2-carboxylic acid,
  6-(methylthio)-thioxanthone-2-carboxylic acid,
  6-(isopropylthio)-thioxanthone-2-carboxylic acid,
  6-(ethylthio)-thioxanthone-2-carboxylic acid,
  6-(n-propylthio)-thioxanthone-2-carboxylic acid,
  6-(n-butylthio)-thioxanthone-2-carboxylic acid,
  6-(sec-butylthio)-thioxanthone-2-carboxylic acid,
  6-(isobutylthio)-thioxanthone-2-carboxylic acid,
  6-(t-butylthio)-thioxanthone-2-carboxylic acid,
  6-(n-pentylthio)-thioxanthone-2-carboxylic acid,
  6-(cyclopropylthio)-thioxanthone-2-carboxylic acid,
  6-(cyclobutylthio)-thioxanthone-2-carboxylic acid,
  6-(cyclopentylthio)-thioxanthone-2-carboxylic acid,
and the 10-oxo and 10,10-dioxo compounds thereof.

EXAMPLE 33

The following compounds are prepared using the procedures of Examples 25 to 28 with the starting materials of Example 32:
  6-(methylsulfonyl)-thioxanthone-2-carboxylic acid,
  6-(isopropylsulfonyl)-thioxanthone-2-carboxylic acid,
  6-(ethylsulfonyl)-thioxanthone-2-carboxylic acid,
  6-(n-propylsulfonyl)-thioxanthone-2-carboxylic acid,
  6-(n-butylsulfonyl)-thioxanthone-2-carboxylic acid,
  6-(sec-butylsulfonyl)-thioxanthone-2-carboxylic acid,
  6-(isobutylsulfonyl)-thioxanthone-2-carboxylic acid,
  6-(t-butylsulfonyl)-thioxanthone-2-carboxylic acid,
  6-(n-pentylsulfonyl)-thioxanthone-2-carboxylic acid,
  6-(cyclopropylsulfonyl)-thioxanthone-2-carboxylic acid,
  6-(cyclobutylsulfonyl)-thioxanthone-2-carboxylic acid,
  6-(cyclopentylsulfonyl)-thioxanthone-2-carboxylic acid,
  6-(methylsulfinyl)-thioxanthone-2-carboxylic acid,
  6-(isopropylsulfinyl)-thioxanthone-2-carboxylic acid,
  6-(ethylsulfinyl)-thioxanthone-2-carboxylic acid,
  6-(n-propylsulfinyl)-thioxanthone-2-carboxylic acid,
  6-(n-butylsulfinyl)-thioxanthone-2-carboxylic acid,
  6-(sec-butylsulfinyl)-thioxanthone-2-carboxylic acid,
  6-(isobutylsulfinyl)-thioxanthone-2-carboxylic acid,
  6-(t-butylsulfinyl)-thioxanthone-2-carboxylic acid,
  6-(n-pentylsulfinyl)-thioxanthone-2-carboxylic acid,
  6-(cyclopropylsulfinyl)-thioxanthone-2-carboxylic acid,
  6-(cyclobutylsulfinyl)-thioxanthone-2-carboxylic acid,
  6-(cyclopentylsulfinyl)-thioxanthone-2-carboxylic acid,
  6-(chlorosulfonyl)-thioxanthone-2-carboxylic acid,
  6-(sulfo)-thioxanthone-2-carboxylic acid,
  6-(sulfamoyl)-thioxanthone-2-carboxylic acid,
  6-(methylsulfamoyl)-thioxanthone-2-carboxylic acid,
  6-(ethylsulfamoyl)-thioxanthone-2-carboxylic acid,
  6-(n-propylsulfamoyl)-thioxanthone-2-carboxylic acid,
  6-(isopropylsulfamoyl)-thioxanthone-2-carboxylic acid,
  6-(dimethylsulfamoyl)-thioxanthone-2-carboxylic acid,
  6-(diethylsulfamoyl)-thioxanthone-2-carboxylic acid,
  6-(di-n-propylsulfamoyl)-thioxanthone-2-carboxylic acid,
  6-(di-isopropylsulfamoyl)-thioxanthone-2-carboxylic acid, and so forth,
and the 10-oxo and 10,10-dioxo compounds thereof.

EXAMPLE 34

6-(Lower alkyl)-thioxanthone-2-carboxylic compounds are prepared in accordance with the procedures of Example 29 from the appropriate starting compounds. Thus prepared, for example, are:
  6-(methyl)-thioxanthone-2-carboxylic acid,
  6-(ethyl)-thioxanthone-2-carboxylic acid,
  6-(n-propyl)-thioxanthone-2-carboxylic acid,
  6-(n-butyl)-thioxanthone-2-carboxylic acid,
  6-(isobutyl)-thioxanthone-2-carboxylic acid,
  6-(n-pentyl)-thioxanthone-2-carboxylic acid,
  6-(isopentyl)-thioxanthone-2-carboxylic acid,
  6-(sec-pentyl)-thioxanthone-2-carboxylic acid,
  6-(t-pentyl)-thioxanthone-2-carboxylic acid,
  6-(n-hexyl)-thioxanthone-2-carboxylic acid,
  6-(cyclopropylmethyl)-thioxanthone-2-carboxylic acid,
  6-(cyclobutylmethyl)-thioxanthone-2-carboxylic acid,
  6-(cyclopentylmethyl)-thioxanthone-2-carboxylic acid, and so forth.

EXAMPLE 35

5,7-(Di(methylthio))-thioxanthone-2-carboxylic acid is prepared as described in Example 5 from o,p-(dimethylthio)-thiophenol.

Likewise, the corresponding 5,7-(di(lower alkylthio))-thioxanthone-2-carboxylic acids are prepared.

The lower alkyl esters thereof are prepared as described in Example 9.

EXAMPLE 36

By following the procedures of Examples 25 to 28, the following are prepared:
  5,7-(di(methylsulfinyl))-thioxanthone-2-carboxylic acid,
  5,7-(di(isopropylsulfinyl))-thioxanthone-2-carboxylic acid, 5,7-(di(ethylsulfinyl))-thioxanthone-2-carboxylic acid, and so forth,
5,7-(di(methylsulfonyl))-thioxanthone-2-carboxylic acid,
5,7-(di(isopropylsulfonyl))-thioxanthone-2-carboxylic acid,
5,7-(di(ethylsulfonyl))-thioxanthone-2-carboxylic acid, and so forth,
5,7-(dimercapto)-thioxanthone-2-carboxylic acid,
5,7-(di(chlorosulfonyl))-thioxanthone-2-carboxylic acid,
5,7-(disulfo)-thioxanthone-2-carboxylic acid,
5,7-(di(sulfamoyl))-thioxanthone-2-carboxylic acid,
5,7-(di(methylsulfamoyl))-thioxanthone-2-carboxylic acid,
5,7-(di(ethylsulfamoyl))-thioxanthone-2-carboxylic acid,
5,7-(di(dimethylsulfamoyl))-thioxanthone-2-carboxylic acid, and so forth,
and the 10-oxo and 10,10-dioxo compounds thereof.

EXAMPLE 37

The compounds 5,7-(di(lower alkyl))-thioxanthone-2-carboxylic acid are prepared according to the procedures of Examples 1 to 3.

EXAMPLE 38

The compounds 5-loweralkyl or -loweralkoxy-7-(loweralkylthio)-xanthone-2-carboxylic acid, e.g.
 5-methyl-7-(methylthio)-thioxanthone-2-carboxylic acid,
 5-isopropyl-7-(methylthio)-thioxanthone-2-carboxylic acid,
 5-methoxy-7-(methylthio)-thioxanthone-2-carboxylic acid,
 5-n-isopropoxy-7-(methylthio)-thioxanthone-2-carboxylic acid,
 7-methyl-7-(isopropylthio)-thioxanthone-2-carboxylic acid,
 7-isopropyl-7-(isopropylthio)-thioxanthone-2-carboxylic acid,
 7-methoxy-7-(isopropylthio)-thioxanthone-2-carboxylic acid,
 7-n-isopropoxy-7-(isopropylthio)-thioxanthone-2-carboxylic acid,
 5-methyl-7-(methylsulfinyl)-thioxanthone-2-carboxylic acid,
 5-methyl-7-(methylsulfonyl)-thioxanthone-2-carboxylic acid,
 5-isopropyl-7-(methylsulfinyl)-thioxanthone-2-carboxylic acid,
 5-isopropyl-7-(methylsulfonyl)-thioxanthone-2-carboxylic acid,
 5-methoxy-7-(methylsulfinyl)-thioxanthone-2-carboxylic acid,
 5-methoxy-7-(methylsulfonyl)-thioxanthone-2-carboxylic acid,
 5-isopropoxy-7-(methylsulfinyl)-thioxanthone-2-carboxylic acid,
 5-isopropoxy-7-(methylsulfonyl)-thioxanthone-2-carboxylic acid,
 5-methyl-7-(isopropylsulfinyl)-thioxanthone-2-carboxylic acid,
 5-methyl-7-(isopropylsulfonyl)-thioxanthone-2-carboxylic acid,
 5-isopropyl-7-(isopropylsulfinyl)-thioxanthone-2-carboxylic acid,
 5-isopropyl-7-(isopropylsulfonyl)-thioxanthone-2-carboxylic acid,
 5-isopropoxy-7-(isopropylsulfinyl)-thioxanthone-2-carboxylic acid,
 5-isopropoxy-7-(isopropylsulfonyl)-thioxanthone-2-carboxylic acid, and so forth,
and the 10-oxo and 10,10-dioxo compounds thereof, are prepared in accordance with the procedures of Examples 1 to 3 and 25 and 26.

EXAMPLE 39

Example 38 is repeated to prepare the 5-(lower alkylthio)-7-lower alkyl or -lower alkoxy-thioxanthone-2-carboxylic acid compounds and the sulfinyl and sulfonyl compounds otherwise corresponding thereto.

EXAMPLE 40

The procedures of Examples 27 and 28 are repeated using the compounds 5-lower alkyl- or -lower alkoxy-thioxanthone-2-carboxylic acids to give:
 5-methyl-7-(chlorosulfonyl)-thioxanthone-2-carboxylic acid,
 5-isopropyl-7-(chlorosulfonyl)-thioxanthone-2-carboxylic acid,
 5-methoxy-7-(chlorosulfonyl)-thioxanthone-2-carboxylic acid,
 5-isopropoxy-7-(chlorosulfonyl)-thioxanthone-2-carboxylic acid,
 5-methyl-7-(sulfo)-thioxanthone-2-carboxylic acid,
 5-isopropyl-7-(sulfo)-thioxanthone-2-carboxylic acid,
 5-methoxy-7-(sulfo)-thioxanthone-2-carboxylic acid,
 5-isopropoxy-7-(sulfo)-thioxanthone-2-carboxylic acid,
 5-methyl-7-(sulfamoyl)-thioxanthone-2-carboxylic acid,
 5-isopropyl-7-(sulfamoyl)-thioxanthone-2-carboxylic acid,
 5-methoxy-7-(sulfamoyl)-thioxanthone-2-carboxylic acid,
 5-isopropoxy-7-(sulfamoyl)-thioxanthone-2-carboxylic acid,
 5-methyl-7-(dimethylsulfamoyl)-thioxanthone-2-carboxylic acid,
 5-isopropyl-7-(dimethylsulfamoyl)-thioxanthone-2-carboxylic acid,
 5-methoxy-7-(dimethylsulfamoyl)-thioxanthone-2-carboxylic acid,
 5-isopropoxy-7-(dimethylsulfamoyl)-thioxanthone-2-carboxylic acid, and so forth, and the 10-oxo and 10,10-dioxo compounds thereof.

EXAMPLE 41

The procedure of Example 40 is repeated to prepare the corresponding 5-chlorosulfonyl-, 5-sulfo- and 5-sulfamoyl-compounds in the 7-lower alkyl- or -lower alkoxy series.

EXAMPLE 42

To a solution of 25 grams of 7-(methyl)-thioxanthone-2-carboxylic acid in 200 ml. of triethylene glycol are added 18 g. of potassium hydroxide in 12.1 g. of 95% hydrazine. The resultant mixture is heated to reflux (155°C) and maintained thereat for 1 hour. The distillate is removed and the temperature is held at a temperature of about 200°C for 2 hours. The mixture is then cooled to 68°C and 200 ml. of water is added and the resultant solution poured into 110 ml. of water containing 60 ml. of concentrated hydrochloric acid. The resultant mixture is heated to 90°C, cooled to room temperature and filtered to give 7-(methyl)-thioxanthene-2-carboxylic acid.

Twenty-six grams of 7-(methyl)-thioxanthene-2-carboxylic acid is added to 400 ml. of absolute methanol. To the resultant solution are added 18 ml. of concentrated sulfuric acid and the mixture is then heated at reflux for about 2 hours. The mixture is then cooled to 40°C and sufficient water is added to bring the total volume to 1400 ml. The resultant mixture is then filtered to give methyl 7-(methyl)-thioxanthene-2-carboxylate.

A mixture of 130 g. of methyl 7-(methyl)-thioxanthene-2-carboxylate in 200 ml. of dichloroethane is cooled to −5°C and to the cooled solution are added 4.95 ml. of acetyl chloride and then 17.0 g. of aluminum trichloride. The resultant solution is stirred at room temperature for 1.75 hours. After this time, the solution is poured into a mixture of 300 g. of ice, 700 ml. of water and 20 ml. of concentrated hydrochloric acid. The mixture is then extracted with three 500 ml. portions of methylene chloride. The combined extracts are washed with water and the washed solution evaporated to give methyl 5-acetyl-7-(methyl)-thioxanthene-2-carboxylate.

To a solution of 1.42 g. of methyl 5-acetyl-7-(methyl)-thioxanthene-2-carboxylate in 120 ml. of benzene are added 12.5 g. of manganese dioxide. The resultant mixture is stirred at room temperature for 16 hours. After this time, the mixture is filtered and stripped of solvent to give methyl 5-acetyl-7-(methyl)-thioxanthone-2-carboxylate which is recrystallized from methanol (displacement from methylene chloride solution).

A solution of 2 g. of methyl 5-acetyl-7-(methyl)-thioxanthone-2-carboxylate in 200 ml. of 10% aqueous, 10% potassium hydroxide in methanol is heated at reflux under a nitrogen atmosphere for 45 minutes. After this time, 20ml. of water are added and the resultant mixture heated at reflux for 35 minutes. Water (300 ml.) is then added and the resultant mixture acidified and filtered to give 5-acetyl-7-(methyl)-thioxanthone-2-carboxylic acid.

Upon using the appropriate acyl chloride reagent in the foregoing procedure the other 5-acyl-7-(methyl)-thioxanthone-2-carboxylic acids are prepared. The corresponding 5-acyl-7-lower alkyl- or -lower alkoxy compounds are also thus prepared, as well as the corresponding 5-lower alkyl or -lower alkoxy-7-acyl-thioxanthone-2-carboxylic acid, e.g. 5-isopropyl-7-(acetyl)-thioxanthone-2-carboxylic acid, 5-isopropoxy-7-(acetyl)-thioxanthone-2-carboxylic acid, 5-acetyl-7-(isopropyl)-thioxanthone-2-carboxylic acid, and 5-acetyl-7-(isopropoxy)-thioxanthone-2-carboxylic acid.

These compounds can be reduced as described above to give 5-(1-hydroxyethyl)-7-(methyl)-thioxanthone-2-carboxylic acid, and so forth, and 5-methyl-7-(1-hydroxyethyl)-thioxanthone-2-carboxylic acid, and so forth, and the 10-oxo and 10,10-dioxo compounds thereof.

EXAMPLE 43

The compounds 5-lower alkyl (or 7-lower alkyl)-7-methoxy- (or 5-methoxy)-thioxanthone-2-carboxylic acid are prepared as described in Examples 1 to 3. Thereafter, these compounds are treated in accordance with the procedure of Example 6 to give 5-lower alkyl (or 7-lower alkyl)-7-hydroxy (or 5-hydroxy)-thioxanthone-2-carboxylic acid compounds which are useful as described in the above examples, cf. Example 23 et seq.

EXAMPLE 44

The procedures of Examples 1 to 3 are repeated to prepare the 5,7-(dilower alkoxy)-thioxanthone-2-carboxylic acid compounds hereof. Alternatively, 5,7-(dihydroxy)-thioxanthone-2-carboxylic acid is prepared as described above and treated as follows:

5,7-(Dihydroxy)-thioxanthone-2-carboxylic acid (1.3 g.) in 30 ml. of dimethylformamide containing 5 g. of n-propylbromide and 5 g. of potassium carbonate is stirred at 60°C for 18 hours. The reaction mixture is then acidified and the acidified mixture partially evaporated in vacuum to remove excess n-propylbromide. The mixture is then filtered and the filtered precipitate washed and then dissolved in 100 ml. of ethanol. Twenty milliliters of 2N sodium hydroxide is then added and the resultant mixture refluxed for 60 minutes. The mixture is then cooled, diluted with water, and filtered. The filtrate is acidified and the acidified mixture evaporated to give 5,7-(di(n-propoxy))-thioxanthone-2-carboxylic acid which is recrystallized from ethanol:water. In a similar manner, the other diloweralkoxy compounds are prepared.

EXAMPLE 45

The 5-lower alkyl (or 7-lower alkyl)-7-hydroxy (or 5-hydroxy)-thioxanthone-2-carboxylic acid products of Example 43 are subjected to the procedure of Example 44 to prepare the corresponding lower alkoxy compounds, e.g. 5-methyl-7-(methoxy)-thioxanthone-2-carboxylic acid.

EXAMPLE 46

A mixture of 4.5 grams of 7-(hydroxy)-thioxanthone-2-carboxylic acid, 10 g. of methyl iodide, and 10 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl 7-(hydroxy)-thioxanthone-2-carboxylate.

The foregoing procedure is repeated using the alternate lower alkyl iodides so as to prepare the corresponding lower alkyl acid esters hereof, e.g.
 ethyl 7-(hydroxy)-thioxanthone-2-carboxylate,
 n-propyl 7-(hydroxy)-thioxanthone-2-carboxylate,
 isopropyl 7-(hydroxy)-thioxanthone-2-carboxylate,
 n-propyl 7-(hydroxy)-thioxanthone-2-carboxylate,
 isobutyl 7-(hydroxy)-thioxanthone-2-carboxylate,
 sec-butyl 7-(hydroxy)-thioxanthone-2-carboxylate,
 n-pentyl 7-(hydroxy)-thioxanthone-2-carboxylate,
 and so forth.

In like manner, the other thioxanthone-2-carboxylic acids thereof containing substituents at the C-5 or C-7 positions, prepared as described above, can be converted to the corresponding acid esters, e.g. methyl 5-(methyl)-thioxanthone-2-carboxylate.

EXAMPLE 47

To a solution of 10 grams of 7-(methyl)-thioxanthone-2-carboxylic acid in 200 ml. of ethanol is added the theoretical amount of sodium hydroxide dissolved in 200 ml. of 90% ethanol. The reaction mixture is then concentrated in vacuum to give sodium 7-(methyl)-thioxanthone-2-carboxylate.

Sodium 7-(isopropyl)-thioxanthone-2-carboxylic acid and sodium 7-(isopropoxy)-thioxanthone-2-carboxylic acid are also thus prepared.

In a similar manner, the potassium and lithium salts are prepared. Similarly, by replacing the sodium salt by means of an appropriate metal salt reagent, e.g. calcium chloride, manganese chloride, and so forth, the other thioxanthone-2-carboxylic acid salts are prepared, e.g.

magnesium 7-(methyl)-thioxanthone-2-carboxylate,
calcium 7-(methyl)-thioxanthone-2-carboxylate,
aluminum 7-(methyl)-thioxanthone-2-carboxylate,
ferrous 7-(methyl)-thioxanthone-2-carboxylate,
zinc 7-(methyl)-thioxanthone-2-carboxylate,
manganese 7-(methyl)-thioxanthone-2-carboxylate,
ferric 7-(methyl)-thioxanthone-2-carboxylate, and so forth.

In a similar manner, the thioxanthone-2-carboxylic acid salts of the other C-5 and C-7 substituted thioxanthone-2-carboxylic acids hereof are prepared.

EXAMPLE 48

To a mixture of 50 milliliters of concentrated aqueous ammonia in 500 ml. of methanol there are added 20 g. of 7-(isopropyl)-thioxanthone-2-carboxylic acid. The resultant mixture is stirred for two hours and is then evaporated to dryness to give the ammonium salt of 7-(isopropyl)-thioxanthone-2-carboxylic acid.

A solution of 10 g. of thioxanthone-2-carboxylic acid in 50 ml. of thionyl chloride is heated at reflux for one hour. Thereafter, the solution is evaporated to dryness to give the corresponding acid chloride to which is added a concentrated ethereal ammonia solution. The resultant solution is evaporated giving the ammonium salt of thioxanthone-2-carboxylic acid.

In like manner, the lower alkyl amides can be prepared using monoalkylamine or dialkylamine in lieu of ammonia in the above procedures. Thus prepared, e.g. are:

7-(propyl)-thioxanthone-2-carboxylic acid amide,
N-methyl 7-(n-propoxy)-thioxanthone-2-carboxylic acid amide,
N,N-dimethyl 5-(ethyl)-thioxanthone-2-carboxylic acid amide,
N,N-diethyl 7-(fluoro)-thioxanthone-2-carboxylic acid amide,
N-ethyl 7-(methyl)-thioxanthone-2-carboxylic acid amide,
N-n-propyl 7-(isopropoxy)-thioxanthone-2-carboxylic acid amide, and so forth.

EXAMPLE 49

To a mixture of 20 grams of procaine and 500 ml. of aqueous methanol are added 20 g. of 7-(isopropoxy)-thioxanthone-2-carboxylic acid. The resultant mixture is stirred at room temperature for 16 hours. It is then evaporated under reduced pressure, to give the procaine salt of 7-(isopropoxy)-thioxanthone-2-carboxylic acid.

Similarly, the lysine, caffeine, and arginine salts thereof are obtained. In like manner, the e.g. procaine, lysine, caffeine, and arginine salts of the other 5- and 7-substituted thioxanthone-2-carboxylic acids are obtained, e.g.

the procaine salt of 7-(methyl)-thioxanthone-2-carboxylic acid,
the caffeine salt of 5-(isopropyl)-thioxanthone-2-carboxylic acid,
the lysine salt of 7-(ethyl)-thioxanthone-2-carboxylic acid,
the procaine salt of 5-(hydroxymethyl)-thioxanthone-2-carboxylic acid, and
the arginine salt of 7-(isopropyl)-thioxanthone-2-carboxylic acid.

EXAMPLE 50

Sodium chloride (0.44 grams) is dissolved in 80 ml. of a (9.47 g/l. water) sodium hydrogen phosphate solution. A sodium dihydrogen phosphate (8.00 g/l. water) solution (20 ml.) is then added thereto. The resultant solution having a pH of 7.38 is sterilized in an autoclave. This vehicle is then added to solid, dry sodium thioxanthone-2-carboxylate to give a preparation suitable for intravenous injection containing 2.5 mg. of sodium thioxanthone-2-carboxylate per milliliter of total composition.

EXAMPLE 51

7-(Isopropoxy)-thioxanthone-2-carboxylic acid is dissolved in a vehicle having a composition ranging from propylene glycol:water of 10:90 (w/w) to propylene glycol:water of 50:50 (w/w) to give an aerosol preparation suitable for inhalation.

EXAMPLE 52

Sodium 7-(isopropoxy)-thioxanthone-2-carboxylic acid (1 part) is mixed with from 1 to 10 parts (by weight) of lactose or urea to give a powder preparation suitable for administration by nebulization.

EXAMPLE 53

Tablet preparations suitable for oral administration are prepared by mixing the following ingredients in the indicated proportions:

| Component | Percent, by weight |
|---|---|
| a thioxanthone-2-carboxylic acid compound hereof | 0.5 – 70 |
| polyvinylpyrrolidone | 0.5 – 10 |
| starch | 10 – 25 |
| lactose | 20 – 75 |
| magnesium stearate | 0.1 – 1 |
| granulating fluids (e.g. aqueous methanol, water, chloroform) | |

EXAMPLE 54

The following procedure illustrates a test procedure for the compounds hereof.

Normal female (Sprague-Dawley) rats of 150 to 200 grams each are passively sensitized intradermally by injection of rat anti-egg albumin reaginic sera. After 24 hours, each rat is challenged intravenously with 1.75 ml. of 0.4% Evans blue, 1 mg. egg albumin plus 10.0 mg. of thioxanthone-2-carboxylic acid. Control rats receive no thioxanthone-2-carboxylic acid. The dermal bluing is recorded 15 to 25 minutes later. The rats which receive the thioxanthone-2-carboxylic acid exhibit a 100 percent inhibition of allergic reaction whereas the control rats exhibit no inhibition.

The above procedure is repeated using 7-methoxy-thioxanthone-2-carboxylic acid, with similar results. The above procedure is repeated using oral administration, with similar results.

Thioxanthone-2-carboxylic acid compounds are administered by gavage at a dose of 20 mg. per animal 15 minutes prior to challenge. Twenty to thirty minutes after challenge the degree of dermal bluing is read, with similar results.

EXAMPLE 55

A dosage of 100 mg. per kg. of body weight of thioxanthone-2-carboxylic acid is given intraperitoneally to guinea pigs. Other pigs are left untreated to serve as controls. After treatment, the treated pigs and the controls are exposed to an aqueous spray of 0.05% histamine diphosphate (calc. as base), delivered by a nebulizer, until they exhibit a loss of righting ability. During exposure they are observed for severity of reaction. This ranges from slightly deeper breathing to deep breathing to preconvulsive gasping and ataxia to collapse. The pigs which receive the thioxanthone-2-carboxylic acid exhibit a significant resistance to the histamine aerosol challenge, whereas all control pigs collapse within the exposure time.

The trachea of a recently sacrificed guinea pig is removed by disection and cut between the segments of cartilege into rings containing tracheal muscle which are tied to form a 180° alternating smooth muscle tracheal chain. The thus produced continuous length of smooth muscle is mounted in a tissue bath maintained at 37°C with the upper end attached to a linear motion transducer which in turn is connected to a recorder. The responses of a standard, aminophylline, and thioxanthone-2-carboxylic acid are compared after introducing each separately into the bath in various amounts or concentrations. The results show a significant degree of relaxation of the tracheal chain with the test compound.

Inhibition of reaginic antigen-antibody reactions in rats is regarded as representative of inhibition of human reaginic antigen-antibody reactions which occur during allergic episodes. Protection against histamine aerosol induced bronchoconstriction and relaxation of isolated tracheal chain, as described above, is regarded as representative of and translatable to human bronchopulmonary activity including bronchodilator activity. For example, human subjects suffering from asthma or other bronchopulmonary disorders are studied as to severity of bronchospasm and changes in severity by observable and measurable changes in expiratory function. Such measurements include quantitation of expiratory pulmonary air flow, measurable by such instruments as peak flow meter, and comparison of pulmonary volumes before and after treatment with the subject compounds hereof, as measured by spirometric and/or plethysmographic methods. Subjective relief of the symptoms upon administration of the compounds hereof is evidenced by improvements in dyspnea, wheezing, cough and expectorated sputum.

What is claimed is:

1. A compound selected from those represented by the following formulas:

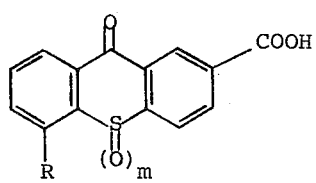

(A)

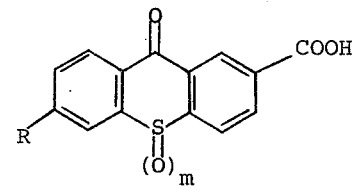

(B)

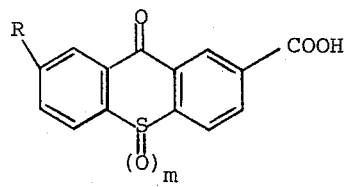

(C)

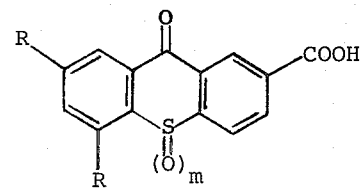

(D)

or a pharmaceutically acceptable, non-toxic lower straight or branched chain alkyl containing one to five carbon atoms or glycerol ester, unsubstituted, mono-lower alkyl, dilower alkyl, dilower alkylamino lower alkyl, lower alkoxy lower alkyl, in which the lower alkyl or lower alkoxy moiety is straight or branched chain containing one to five carbon atoms, or phenethyl substituted amide or salt thereof; wherein each m is the integer 0, 1 or 2, each R is a group selected from those of the formulas:

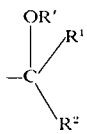  

in which R' is hydrogen, lower straight or branched chain alkyl containing one to five carbon atoms, cycloalkyl containing three to six carbon atoms, tetrahydrofuran-2-yl, tetrahydropyran-2-yl, tetrahydropyran-4-yl, 4-lower alkoxytetrahydropyran-4-yl in which the lower alkoxy moiety is straight or branched chain containing one to five carbon atoms, or alkanoyl containing up to 4 carbon atoms; R¹ is hydrogen, lower straight or branched chain alkyl containing one to five carbon atoms, or cycloalkyl containing three to six carbon atoms; R² is hydrogen, lower straight or branched chain alkyl containing one to five carbon atoms, cycloalkyl containing three to six carbon atoms; phenyl, substituted phenyl (in which the substituent is halo, lower straight or branched chain alkyl containing one to five carbon atoms, lower straight or branched chain alkoxy containing one to five carbon atoms, lower straight or branched chain alkylthio containing one to five carbon atoms, trifluoromethyl, or cyano), or a monocyclic aromatic heterocyclic group having five or six total members, one or two of which are selected from nitrogen, oxygen, and sulfur, selected from pyridyl, pyridazinyl, pyrimidinyl, pyrazinyl, pyrazolyl, imidazolyl, furanyl, thienyl, pyrrolyl, isoxazolyl, and oxazolyl; n is the integer 1 or 2; R³ is lower straight or branched chain alkyl containing one to five carbon atoms when n is 1 and R³ is lower straight or branched chain alkyl containing one to five carbon atoms, hydroxy, amino, monolower (straight or branched chain) alkylamino containing one to five carbon atoms, or dilower alkylamino in which each lower alkyl group is straight or branched chain containing one to five carbon atoms when n is 2.

2. A compound according to claim 1 of formula (A).
3. A compound according to claim 1 of formula (B).
4. A compound according to claim 1 of formula (C).
5. A compound according to claim 4 wherein R is the group

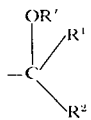

in which each of R' and R¹ is hydrogen and R² is lower straight or branched chain alkyl containing one to five carbon atoms.

6. A compound according to claim 4 wherein R is the group

in which R² is lower straight or branched chain alkyl containing one to five carbon atoms.

7. A compound according to claim 4 wherein R is the group

in which n is 1 and R³ is lower straight or branched chain alkyl containing one to five carbon atoms.

8. A compound according to claim 4 wherein R is the group

in which n is 2 and R³ is lower straight or branched chain alkyl containing one to five carbon atoms.

9. A compound according to claim 1 of formula (D).
10. The compound according to claim 1 which is 7-(1-hydroxyethyl)-thioxanthone-2-carboxylic acid.
11. The compound according to claim 1 which is 7-(acetyl)-thioxanthone-2-carboxylic acid.
12. The compound according to claim 1 which is 7-(methylsulfinyl)-thioxanthone-2-carboxylic acid.
13. The compound according to claim 1 which is 7-(methylsulfonyl)-thioxanthone-2-carboxylic acid.
14. The sodium salts of the compounds of claim 1.
15. A compound selected from the group consisting of:

5-isopropyl-7-(acetyl)-thioxanthone-2-carboxylic acid,
5-isopropoxy-7-(acetyl)-thioxanthone-2-carboxylic acid,
5-isopropyl-7-(methylsulfinyl)-thioxanthone-2-carboxylic acid,
5-isopropoxy-7-(methylsulfinyl)-thioxanthone-2-carboxylic acid,
5-acetyl-7-(isopropyl)-thioxanthone-2-carboxylic acid,
5-acetyl-7-(isopropoxy)-thioxanthone-2-carboxylic acid,
5-methylsulfinyl-7-(isopropyl)-thioxanthone-2-carboxylic acid, and
5-methylsulfinyl-7-(isopropoxy)-thioxanthone-2-carboxylic acid.

16. The compound according to claim 15 which is 5-isopropyl-7-(acetyl)-thioxanthone-2-carboxylic acid.
17. The compound according to claim 15 which is 5-isopropoxy-7-(acetyl)-thioxanthone-2-carboxylic acid.
18. The compound according to claim 15 which is 5-isopropyl-7-(methylsulfinyl)-thioxanthone-2-carboxylic acid.
19. The compound according to claim 15 which is 5-isopropoxy-7-(methylsulfinyl)-thioxanthone-2-carboxylic acid.
20. The compound according to claim 15 which is 5-acetyl-7-(isopropyl)-thioxanthone-2-carboxylic acid.
21. The compound according to claim 15 which is 5-acetyl-7-(isopropoxy)-thioxanthone-2-carboxylic acid.
22. The compound according to claim 15 which is 5-methylsulfinyl-7-(isopropyl)-thioxanthone-2-carboxylic acid.
23. The compound according to claim 15 which is 5-methylsulfinyl-7-(isopropoxy)-thioxanthone-2-carboxylic acid.

* * * * *